US008417709B2

(12) United States Patent
Chiticariu et al.

(10) Patent No.: US 8,417,709 B2
(45) Date of Patent: Apr. 9, 2013

(54) AUTOMATIC REFINEMENT OF INFORMATION EXTRACTION RULES

(75) Inventors: Laura Chiticariu, San Jose, CA (US); Bin Liu, Ann Arbor, MI (US); Frederick R. Reiss, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 357 days.

(21) Appl. No.: 12/788,407

(22) Filed: May 27, 2010

(65) Prior Publication Data
US 2011/0295854 A1    Dec. 1, 2011

(51) Int. Cl.
G06F 17/30    (2006.01)
(52) U.S. Cl.
USPC .......................... 707/743; 705/7.11
(58) Field of Classification Search .......... 707/104, 707/740, 608, 759, 737; 706/20, 47, 13, 706/14; 705/7
See application file for complete search history.

(56) References Cited

U.S. PATENT DOCUMENTS

| 6,606,625 | B1 | 8/2003 | Muslea et al. |
| 7,480,640 | B1* | 1/2009 | Elad et al. ........................ 706/14 |
| 7,552,472 | B2 | 6/2009 | Baffes et al. |
| 7,877,343 | B2* | 1/2011 | Cafarella et al. ................ 706/20 |
| 8,037,078 | B2* | 10/2011 | Frank ............................ 707/748 |
| 2001/0009031 | A1* | 7/2001 | Nitta et al. ...................... 716/13 |
| 2007/0078873 | A1* | 4/2007 | Avinash et al. ............... 707/101 |
| 2007/0112824 | A1 | 5/2007 | Lock et al. |
| 2009/0138304 | A1 | 5/2009 | Aharoni et al. |
| 2009/0292729 | A1* | 11/2009 | Blount et al. .............. 707/104.1 |
| 2010/0005049 | A1* | 1/2010 | Kawai et al. ..................... 706/47 |
| 2010/0070463 | A1* | 3/2010 | Zhao et al. ..................... 707/608 |
| 2010/0114628 | A1* | 5/2010 | Adler et al. ........................ 705/7 |
| 2010/0287204 | A1* | 11/2010 | Amini et al. .................. 707/802 |
| 2010/0299339 | A1* | 11/2010 | Kementsietsidis et al. ... 707/759 |
| 2010/0312769 | A1* | 12/2010 | Bailey et al. .................. 707/740 |
| 2011/0093463 | A1* | 4/2011 | Oliver et al. .................. 707/737 |

OTHER PUBLICATIONS

Shen et al.; Toward Best-Effort Information Extraction; SIGMOD '08, Jun. 9-12, 2008, Vancouver, BC, Canada. Copyright 2008 ACM 978-1-60558-102-Jun. 8, 2006; 12 pages.
Glavic et al.; Perm: Processing provenance and data on the same data model through query rewriting; University of Zurich; http://www.zora.uzh.ch; 2009; 14 pages.
Green et al.; Provenance Semirings; PODS'07, Jun. 11-14, 2007, Beijing, China, Copyright 2007 ACM 978-1-59593-685-Jan. 7, 0006; 10 pages.
Krishnamurthy et al.; SystemT: A System for Declarative Information Extraction; http://www.almaden.ibm.com/cs/projects/avatar/; SIGMOD Record, Dec. 2008 (vol. 37, No. 4); pp. 7-13.
Reiss et al.; An Algebraic oach to Rule-Based Information Extraction; [frreiss, rsriram,rajase,huaiyu,shiv]@us.ibm.com; 10 pages. Filed Jan. 31, 2008; U.S. Appl. No. 12/023,479; Published US 0198646 A1 Aug. 6, 2009.

* cited by examiner

*Primary Examiner* — James Trujillo
*Assistant Examiner* — Thong Vu
(74) *Attorney, Agent, or Firm* — Schmeiser, Olsen & Watts

(57) ABSTRACT

A method and system for automatically refining information extraction (IE) rules. A provenance graph for IE rules on a set of test documents is determined. The provenance graph indicates a sequence of evaluations of the IE rules that generates an output of each operator of the IE rules. Based on the provenance graph, high-level rule changes (HLCs) of the IE rules are determined. Low-level rule changes (LLCs) of the IE rules are determined to specify how to implement the HLCs. Each LLC specifies changing an operator's structure or inserting a new operator in between two operators. Based on how the LLCs affect the IE rules and previously received correct results of applying the rules on the test documents, a ranked list of the LLCs is determined. The IE rules are refined based on the ranked list.

17 Claims, 11 Drawing Sheets

Dictionary file *first_names.dict*: anna, james, ...
Dictionary file *street_suffix.dict*: ave, blvd, st, way, ...

R1: create view Phone as
    Regex('\d{3}-\d{4}', Document, text);

R2: create view FirstNameCand as
    Dictionary('first_names.dict', Document, text);

R3: create view FirstName as
    select * from FirstNameCand F
    where Not(ContainsDict('street_suffix.dict', RightContextTok(F.match,1)));

R4: create view PersonPhoneAll as
    select Merge(F.match, P.match) as match
    from FirstName F, Phone P
    where Follows(F.match, P.match, 0, 60);

R5: --Create the output of the extractor
    create table PersonPhone(match span)
    insert into PersonPhone
    ( select * from PersonPhoneAll A )
    except all
    ( select A1.* from PersonPhoneAll A1, PersonPhoneAll A2
    where Contains(A1.match, A2.match and Not(Equals(A1.match, A2.match)) );

Input document:
"Anna at James St. office (555-1234), or James, her assistant – 555-7789 have the details."

Document:
*text*
$t_0$: Anna at James St. office (555-1234), or James, her assistant – 555-7789 have the details.

Phone:
*match*
$t_1$: 555-1234
$t_2$: 555-7789

FirstNameCand:
*match*
$t_3$: Anna
$t_4$: James
$t_5$: James

FirstName:
*match*
$t_6$: Anna
$t_7$: James

PersonPhoneAll:
*match*
$t_8$: Anna at James St. office (555-1234
$t_9$: James, her assistant – 555-7789
$t_{10}$: Anna at James St. office (555-1234), or James, her assistant – 555-7789

PersonPhone:
*match*
$t_{11}$: Anna at James St. office (555-1234
$t_{12}$: James, her assistant – 555-7789

GenerateHLCs(G, X, D)

Input: Operator graph G of a set of rules Q, set X of false positives in the output of G (i.e., Q) applied to input document collection D.
Output: Set H of high-level changes.
Let H = ∅

1. Compute the provenance graph $G_p^{Q,D}$ of Q and D;

2. For every $t \in X$ do CollectHLCs($G_p^{Q,D}$, t, H);

3. Return H.

Procedure CollectHLCs($G_p$, t', H)

Input: Provenance graph $G_p$, node t' in $G_p$, set of high-level changes H. If t' is a tuple of the document instance, return.

Otherwise, let $e: T \xrightarrow{Op} t'$ be the incoming edge of t' in $G_p$. Do:

1. Add(t', Op) to H;

2. If e is of type $t'' \xrightarrow{Op} t'$, where $Op \in \{\pi, \sigma, \cup, \delta, Regex, Dictionary\}$,
   do CollectHLCs($G_p$, t'', H).

Otherwise, e is of type $\{t_1, ..., t_n\} \xrightarrow{\bowtie} t'$. Do CollectHLCs($G_p, t_i, H$),
   for all $t_i$, $1 \le i \le n$

FIG. 6

JAPE

```
Rule: CandidatePersonName
 Priority: 1
   (
     { Lookup.kind == firstName }
     { Token.orthography == initialCaps }
   ):match
--> :match.kind = "CandidateName";
```

AQL

```
create view CandidatePersonName as
select CombineSpans(F.name, L.name) as name
from (extract dictionary FirstNameDict
    on D.text as name from Document D) F,
   (extract regex /[A-Z][a-z]+/
    on D.text as name from Document D) L
where FollowsTok(F.name, L.name, 0, 0)
consolidate on name;
```

XLog

```
CandidatePersonName(d, f, l) :-
    docs(d),
    firstNamesDict(fn),
    match(d, fn, f),
    match(d, "[A-Z][a-z]+", l),
    immBefore(f, l);
```

FIG. 8

| Type | Format | Description |
|---|---|---|
| Predicate function | Follows/FollowsTok(span₁,span₂,n₁,n₂) | Tests if $span_2$ follows $span_1$ within $n_1$ to $n_2$ characters, or tokens |
| | Contains/Contained/Equals(span₁,span₂) | Tests if $span_1$ contains, is contained within, or is equal to $span_2$ |
| | MatchesRegex/ContainsRegex(r, span) | Tests if span matches or contains a match for regular expression r |
| | MatchesDict/ContainsDict(dict, span) | Tests if span matches or contains a match for an entry of dictionary d |
| Scalar function | Merge(span₁,span₂) | Returns the shortest span that completely covers both input spans |
| | Between(span₁,span₂) | Returns the span between $span_1$ and $span_2$ |
| | LeftContext/LeftContextTok(span, n) | Returns the span containing n characters/tokens immediately to the left of span |
| | RightContext/RightContextTok(span n) | Returns the span containing n characters/tokens immediately to the right of span |
| Table function | Regex(r, R, A) | Returns all matches of regular expression r in all R.A values |
| | Dictionary(d, R, A) | Returns all matches of entries in dictionary d in all R.A values |

AUTOMATIC REFINEMENT OF INFORMATION EXTRACTION RULES

FIELD OF THE INVENTION

The present invention relates to information extraction, and more particularly to a technique for automatically refining information extraction rules.

BACKGROUND OF THE INVENTION

Information extraction (i.e., the process of deriving structured information from unstructured text) is an important aspect of many enterprise applications, including semantic search, business intelligence over unstructured data, and data mashups. Systems that perform information extraction for enterprise applications use a set of information extraction rules to define the types of patterns to be identified in the text. An information extraction system expresses the rules in a rule language, such as Java Annotation Patterns Engine (JAPE), Annotation Query Language (AQL), or XLog. JAPE is a component of the open-source General Architecture for Text Engineering (GATE) platform. AQL is an annotation rule language that specifies rules for SystemT, an information extraction system developed by International Business Machines Corporation located in Armonk, N.Y. XLog is a variant of Datalog with embedded procedural predicates. For example, a system to identify person names in unstructured text may include a number of information extraction rules, such as the following rule, which is expressed in English for clarity: If a match of a dictionary of common first names occurs in the text, followed immediately by a capitalized word, mark the two words as a "candidate person name." The information extraction rules are used in information extraction systems to feed structured information directly into important business processes or used as the feature extraction stage of various machine learning algorithms. Since the downstream processing relative to information extraction tends to be highly sensitive to the quality of the results that the information extraction rules produce, it is important for the extracted information to have very high precision and recall (i.e., the rules produce very few false positive and false negative results). Developing a highly accurate set of information extraction rules with known techniques requires substantial skill and considerable effort. Standard practice is for the developer to go through a complex iterative process: (1) build an initial set of rules; (2) run the rules over a set of test documents and identify incorrect results; (3) examine the rules and determine refinements that can be made to the rule sets to remove incorrect results; and (4) repeat the process. Of these steps, the manual task of identifying rule refinements is by far the most time-consuming. An extractor may have a significant number of rules (e.g., hundreds of rules), and the interactions between these rules may be very complex. When changing rules to remove a given incorrect result, a rule developer must be careful to minimize the effects on existing correct results. The manual work required to identify possible changes for a single false positive result and minimize the effects on existing correct results can take a significant amount of time. Thus, there exists a need to overcome at least one of the preceding deficiencies and limitations of the related art.

SUMMARY OF THE INVENTION

The present invention provides a computer-implemented method of automatically refining rules for information extraction. The method comprises:

a computer system receiving a plurality of documents, a plurality of rules for information extraction, and a plurality of correct results and a plurality of incorrect results from applying the plurality of rules on the plurality of documents;

the computer system determining a provenance graph of the plurality of rules applied on the plurality of documents, wherein for an operator of the plurality of operators, the provenance graph indicates a sequence of evaluations of a set of rules included in the plurality of rules that generates an output of the operator;

the computer system determining a first set of rule changes (high-level changes) to specify a set of operators of the plurality of operators to be changed to eliminate the incorrect results, wherein determining the high-level changes is based on the provenance graph;

the computer system determining a second set of rule changes (low-level changes) to specify how to implement the high-level changes, wherein each low-level change specifies a change in a structure of an operator of the set of operators, or specifies an insertion of a new operator subtree in between two operators of the set of operators;

the computer system determining effects of the low-level changes on the correct results and on the plurality of rules;

the computer system generating a ranked list of the low-level changes based on the determined effects of the low-level changes; and a processor of the computer system implementing the low-level changes based on the ranked list, wherein implementing the low-level changes includes refining the plurality of rules to eliminate the incorrect results and to minimize the determined effects of the low-level changes.

A system and program product corresponding to the above-summarized method are also described and claimed herein.

Embodiments of the present invention provide a technique that leverages a determination of the lineage of a tuple in a database through a sequence of operators to facilitate automatic rule refinement in an information extraction system.

BRIEF DESCRIPTION OF THE DRAWINGS

FIGS. 2A-2B depict an example rule program used by the system of FIG. 1, in accordance with embodiments of the present invention.

FIG. 6 is a flowchart of a process for generating high-level changes in the process of FIG. 4, in accordance with embodiments of the present invention.

FIG. 8 depicts examples of a rule expressed in three different information extraction rule languages, where the rule is utilized by the system of FIG. 1, in accordance with embodiments of the present invention.

FIG. 9 is a table of text-specific predicate, scalar and table functions added to SQL for expressing rules utilized by the system of FIG. 1, in accordance with embodiments of the present invention.

DETAILED DESCRIPTION OF THE INVENTION

Figure 1:
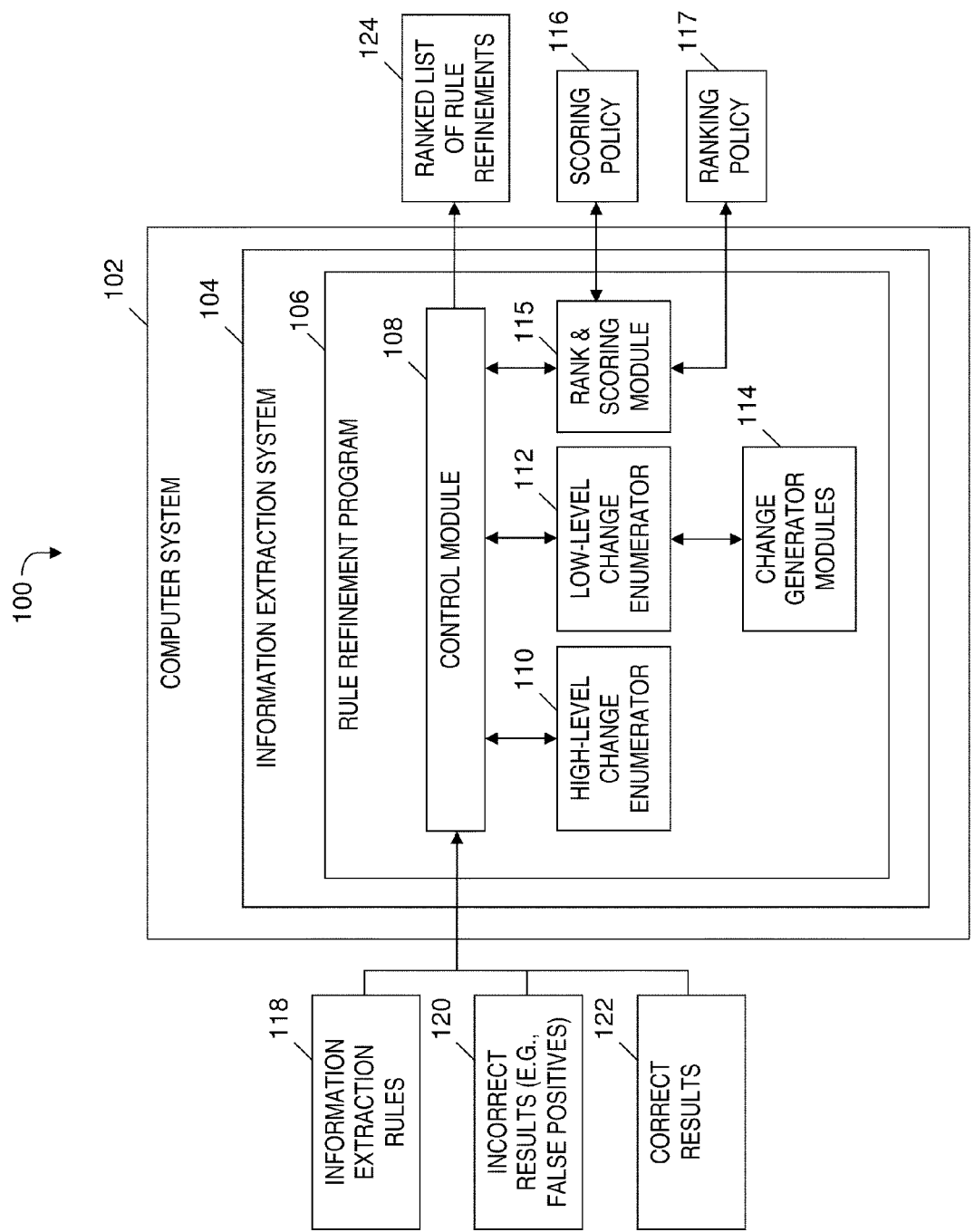
FIG. 1 is a block diagram of a system for automatically refining rules for information extraction, in accordance with embodiments of the present invention.

1. Overview & System for Automatic Rule Refinement

Embodiments of the present invention provide a system and method for automating the refinement stage of the process of developing information extraction rules (a.k.a. "extraction rules" or "rules"). First, the rule developer provides an initial, "rough" set of rules and identifies incorrect results (i.e., false positive results and false negative results) on a set of test documents. Using data provenance-based determinations of lineages of the results, the system automatically determines what changes can be made to the existing rule set to remove the incorrect results without affecting (or while minimizing the effect on) the quality of the current set of correct results. The system then generates a ranked list of possible rule refinements and presents the rule developer with the ranked list.

In the field of data provenance, techniques have been developed to trace the lineage of a tuple in a database through a sequence of operators. This lineage also encodes the relationships between source and intermediate result tuples and the final result. In embodiments of the present invention, data provenance techniques may be used to facilitate information extraction rule refinement. Intuitively, given a false positive result of information extraction, the false positive's lineage may be traced back to the source to understand exactly why the false positive is in the result. Based on the information gained from tracing the lineage, embodiments of the present invention may determine what possible changes can be made to one or more operators along the way to eliminate the false positive, without eliminating true positives.

The field of data provenance studies the problem of explaining the existence of a tuple in the output of a query. Various types of provenance explain why a tuple is in the result (i.e., why-provenance), where the tuple was copied from in the source database (i.e., where-provenance), and how the tuple was generated by the query (i.e., how-provenance). Embodiments disclosed herein leverage how-provenance to generate the set of high-level changes: placeholders in the rule set where a carefully crafted modification may result in eliminating one false positive from the output. However, leveraging how-provenance to generate high-level changes is only a first step of embodiments disclosed herein. In a significant departure from previous work on data provenance, the system disclosed by embodiments of the present invention generates a ranked list of concrete rule modifications that remove false positives, while minimizing the effects on the rest of the results and the structure of the rule set.

The challenges addressed in using provenance-based techniques in embodiments of the present invention are described below in Section 3 and Section 5.

Most information extraction rules can be translated into relational algebra operations in an operator graph (a.k.a. canonical operator graph), as described infra. Over such an operator graph, provenance-based analysis, developed in Section 3 and Section 5, produces a set of proposed rule changes in the form of "remove tuple t from the output of operator O," where tuple t is a "problem" tuple (e.g., a tuple that is a false positive). These proposed rule changes that identify the operator to modify based on provenance analysis are referred to herein as high-level changes. To remove a "problem" tuple from the output of a rule, the rule developer needs to know how to modify the extraction primitives that make up the rule. Such changes to extraction primitives are referred to herein as low-level changes. Extraction primitives include regular expressions and filtering predicates like "is followed by". The low-level changes may in turn result in the removal of additional tuples besides the "problem" tuple, and the rule developer needs to consider these side-effects in evaluating potential rule changes, while simultaneously keeping the rules as simple and easy to maintain as possible.

Section 6 describes a framework for enumerating the low-level changes that correspond to a given set of high-level changes, as well as efficient algorithms for determining the additional side-effects of each proposed low-level change. Using the information about side-effects, embodiments of the present invention may then rank low-level changes according to how well they remove incorrect results (e.g., false positives) without affecting existing correct answers or complicating the rule set. This ranked list of low-level changes may be presented to the rule developer.

In one or more embodiments, a software system automates the rule refinement process described herein. In one embodiment, given a set of rules, a set of false positive results that the rules produce, and a set of correct results, a system automatically identifies candidate rule changes that would eliminate the false positives. The system then determines the overall effects of the candidate rule changes on rule readability and result quality, and produces a ranked list of suggested rule changes. Section 7 includes representative results that demonstrate the effectiveness of embodiments of the present invention.

The techniques that are described herein can be used to automate the rule refinement process across all classes of rule languages, such as rule languages based on the Common Pattern Specification Language, SQL, and Datalog.

Embodiments described herein are complementary to information extraction schemes that use machine learning approaches. In one embodiment, a semi-automatic iterative process with a human in the loop is employed, which represents a new area of the design space for information extraction systems. This design choice may allow the system disclosed herein to handle highly complex rule structures and to leverage expert input. Whereas machine learning models are generally opaque to the user, the rules produced by embodiments of the present invention can be understood and "debugged" by the rule developer. In practice, information extraction systems that employ machine learning generally use rules to extract basic features that serve as the input, and techniques disclosed herein may be used to assist in the process of developing these rules.

Previous work has used machine learning for extraction subtasks like creating dictionaries and character-level regular expressions. These techniques are complementary to embodiments described herein. In one embodiment, a mechanism is provided to "plug in" these machine learning based extraction algorithms as low-level change generation modules.

Embodiments of the present invention differ from approaches that refine an extraction program by posing a series of questions to the user that ask for additional information about a specific predefined feature of the desired extracted data, where the questions are shown to the user in a predefined order, or ordered based on how much each narrows down the result. Embodiments disclosed herein automatically suggest fully-specified, concrete rule refinements based on labeled extracted data, as opposed to asking the user to fill in the blanks in template questions. Furthermore, embodiments disclosed herein are not restricted to adding predefined selection predicates, and consider a much broader space of refinements that include adding and modifying selection predicates, modifying join predicates, modifying regular expression and dictionary extraction specifications, and adding subtraction sub-queries.

FIG. 1 is a block diagram of a system for automatically refining rules for information extraction, in accordance with embodiments of the present invention. System 100 includes a computer system 102, which includes instructions that carry out the logic of an information extraction system 104. Information extraction system 104 runs a rule refinement program 106 that implements a process of automatically refining extraction rules via a determination of high-level changes and low-level changes, and by generating and presenting a ranked list of suggested rule refinements. Rule refinement program 106 includes a control module 108, a high-level change enumerator 110, a low-level change enumerator 112, multiple change generator modules 114, and a rank and scoring module 115. Control module 108 receives information extraction rules 118, a set of incorrect results 120 (e.g., false positive results), and a set of correct results 122. The set of incorrect results 120 and the set of correct results 122 may be received from a user who enters the results 120, 122 via a user interface (e.g., a graphical user interface (GUI) presented on a display coupled to computer system 102). As managed by control module 108, high-level change enumerator 110 enumerates high-level changes to rules 118 and low-level change enumerator 112 enumerates the low-level changes to rules 118, where the enumerated low-level changes correspond to the enumerated high-level changes. The low-level changes enumerated by low-level enumerator 112 are initially determined by the change generator modules 114, where each change generator module determines a corresponding type of low-level change. The rank and scoring module 115 ranks and scores the enumerated low-level changes and sends a suggested list of ranked low-level changes (i.e., rule refinements) to control module 108. The rank and scoring module 115 uses a scoring policy 116 to determine how to measure factors associated with each enumerated low-level change, and a ranking policy to determine how to compute numeric scores that the rank and scoring module 115 assigns to the enumerated low-level changes in a one-to-one correspondence. After receiving the suggested list of ranked low-level changes from the rank and scoring module 115, the control module 108 presents a ranked list of rule refinements 124 (i.e., a ranked list of the enumerated low-level changes) based on the ranks and scores assigned to the enumerated low-level changes. The ranked list of rule refinements 124 is presented to a user (e.g., a rule developer) via a user interface (e.g., a GUI presented on a display coupled to computer system 102). Detailed information about the effects of each low-level change may be presented along with the ranked list of rule refinements 124. The functionality of components of system 100 is further described below relative to FIGS. 4, 6 and 7.

2. Preliminaries

Different information extraction systems have different rule languages for defining information extraction rules. However, most rule languages in common use share a large set of core functionality.

SQL is used herein as a language for expressing information extraction rules to facilitate description of embodiments of the present invention in a way that is consistent with previous work on data provenance. Specifically, the SELECT—PROJECT—JOIN—UNION ALL—EXCEPT ALL subset of SQL is used herein. Note that UNION ALL and EXCEPT ALL are not duplicate-removing, as per the SQL standard.

The use of SQL herein does not in any way preclude the application of embodiments of the present invention to other rule languages. Section 8 indicates that the basic structure of different information extraction rule languages contains key similarities to the SQL representation that is used herein. These rule languages define an extractor as a set of rules with dependency relationships that can be used to construct a provenance graph for computing high-level changes. Information extraction rules are made up of atomic operations that can be modified, added, or deleted to create low-level changes. As such, the high-level/low-level change framework that is defined herein carries over easily to the rule languages in common use today.

Extensions to SQL. To provide easy-to-read examples herein, the SQL language is augmented with shorthands for some basic information extraction primitives.

A new atomic data type called span is added for modeling data values extracted from an input document. A span is an ordered pair (begin, end) that identifies the region of an input document between the begin and end offsets. For clarity, a span may be identified herein by using its string value in addition to the begin and end offsets, or by simply dropping the offsets when they are clear from the context. For example, to identify the region starting at offset 0 and ending at offset 5 in the input document in FIG. 2B, the notations (0, 5), or (0, 5): "Anna", or simply, "Anna" may be used.

The input document is modeled as a table called Document with a single attribute of type span named text.

Several predicates, scalar functions, and table functions are also added to SQL's standard set of built-in functions. These added functions are defined as they are used herein. A complete list of the added functions is also included in Section 9.

Example Rules. FIGS. 2A-2B depict an example rule program used by the system of FIG. 1, in accordance with embodiments of the present invention. Example rule program 200-1 in FIG. 2A and 200-2 in FIG. 2B is expressed in SQL and extracts occurrences of person names and phone numbers corresponding to the person names. The SQL is divided into individual rules, labeled R1 through R5 in FIG. 2A. Rules R1 through R5 define logical views.

Rule R1 illustrates one of the shorthands that is added to SQL: the Regex table function, which evaluates a regular expression over the text of one or more input spans and returns a set of output spans that mark all matches of the expression. In the case of rule R1, the regular expression is matched to phone numbers of the form xxx-xxxx.

Rule R2 shows another addition to SQL: the Dictionary table function, which is similar to the Regex table function. The Dictionary table function identifies all occurrences of a given set of terms specified as entries in a dictionary file (i.e., first_names.dict). In the case of R2, the dictionary file contains a list of common first names. The rule R2 defines a single-column view FirstNameCand containing a span for each dictionary match in the document.

Rule R3 uses a filtering dictionary that matches abbreviations for street names on the regions of text that occur immediately after potential first names, to filter out first names that are actually street names, e.g., "James St." The view definition uses two of the scalar functions that are added to SQL: RightContextTok and ContainsDict. The RightContextTok function takes a span and a positive integer n as input and returns the span consisting of the first n tokens to the right of the input span. The ContainsDict function, used here as a selection predicate, takes a dictionary file (i.e., street_suffix.dict) and a span and returns true if the span contains an entry from the dictionary file.

Rule R4 identifies pairs of names and phone numbers that are between 0 and 60 characters apart in the input document. The view definition uses two of the scalar functions that are added to SQL: Follows and Merge. The Follows function, used here as a join predicate, takes two spans as arguments, along with a minimum and maximum character distance. The Follows function returns true if the spans are within the specified distance of each other in the text. The Merge function takes a pair of spans as input and returns a span that exactly contains both input spans. The select clause in R4 uses Merge to define a span that runs from the beginning of each name to the end of the corresponding phone number.

Finally, rule R5 materializes the table PersonPhone, which constitutes the output of the extractor. Rule R5 uses an EXCEPT ALL clause to filter out candidate name-phone spans strictly containing another candidate name-phone span. The join predicate of the second operand of the EXCEPT ALL clause illustrates two other text-based scalar functions: Equals, which checks if two spans are equal, and Contains, which tests span containment. Note that the false positive $t_{10}$ (see FIG. 2B) in PersonPhoneAll that associates Anna with James' phone number is filtered out by R5, since its span strictly contains other candidate name-phone spans (i.e., from $t_8$ and $t_9$ in FIG. 2B).

Canonical rule representation. To simplify discussions presented below, a canonical algebraic representation (i.e., relational algebra representation) of extraction rules as trees of operators is assumed, such that for each rule, there is a direct one-to-one translation to this canonical representation and back. The canonical representation is very similar, if not identical for the SELECT—FROM—WHERE—UNION ALL—EXCEPT ALL subset of the language, to the representation of SQL statements in terms of relational operators. A rule in the form "SELECT attributes FROM $R_1, \ldots, R_n$ WHERE join—predicates AND selection_predicates" is represented in the usual way as the sequence of project—select—join operators shown below:

$$\pi_{attributes}(\sigma_{selection\_preds}(\bowtie_{join\_preds}(R_1, \ldots, R_n)))$$

When table functions like Dictionary and Regex appear in the FROM clause of a SELECT statement, these table functions are translated to operators by the same names.

It should be noted, however, that other embodiments of the present invention may determine a provenance graph by directly rewriting the extraction rules (i.e., without requiring a transformation of the extraction rules into a relational algebra representation).

Figure 3:
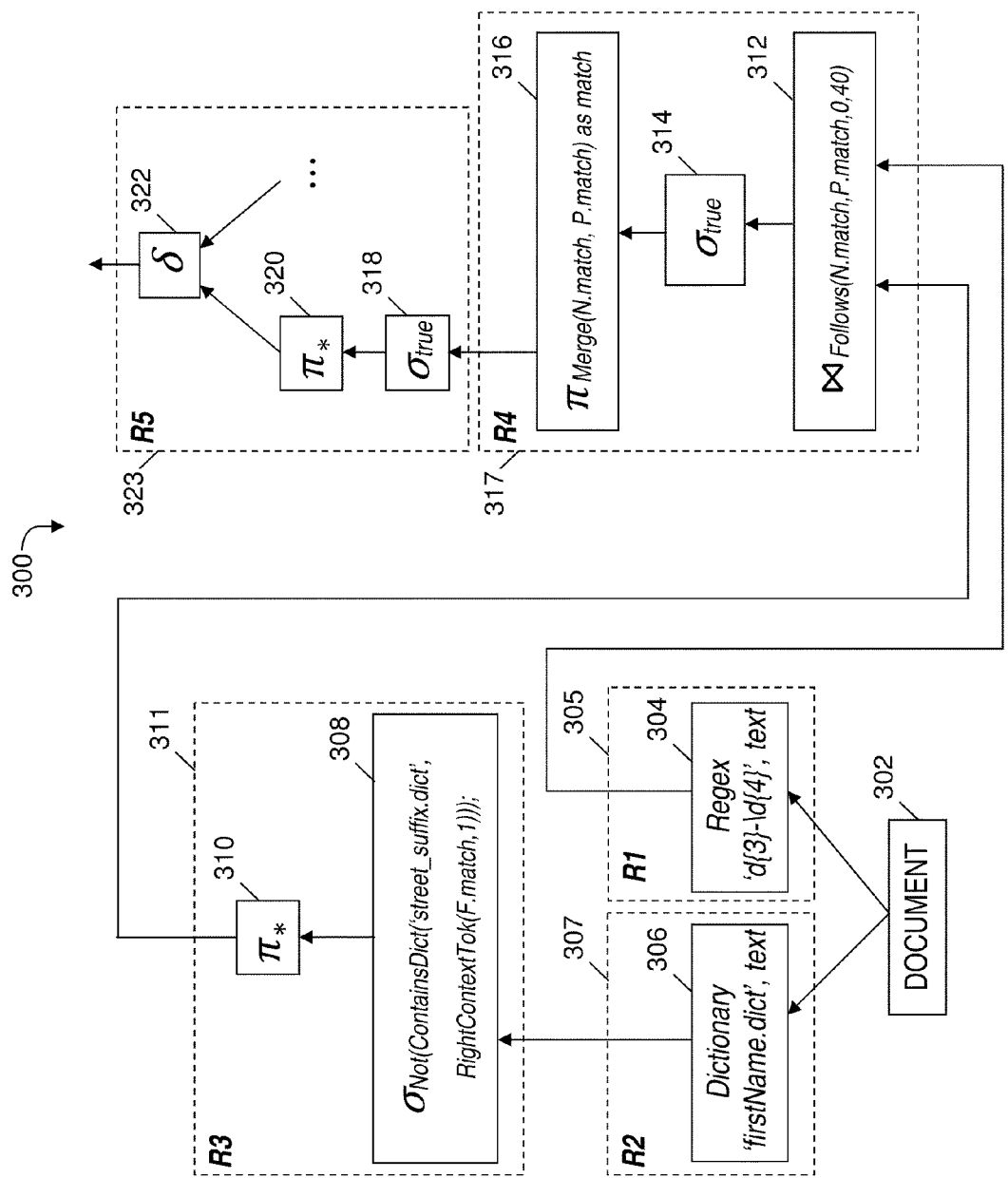
FIG. 3 depicts a canonical operator graph representation of rules in FIGS. 2A-2B, in accordance with embodiments of the present invention.

FIG. 3 depicts a canonical operator graph representation of rules in FIGS. 2A-2B, in accordance with embodiments of the present invention. Canonical operator graph representation 300 is the canonical representation of the example extractor from FIGS. 2A-2B, where the dashed rectangles in FIG. 3 indicate the correspondence between parts of the operator tree and the rule statements R1, R2, R3, R4 and R5 in FIG. 2A. The part corresponding to the second operand of the EXCEPT ALL clause in rule R5 in FIG. 2A is omitted in FIG. 3. Note that when the WHERE clause of a rule does not contain any selection predicates (e.g., R4), the condition in the select operator of the corresponding canonical representation is simply true.

Document 302 corresponds to the input document included in FIG. 2B. The Regex table function 304 operates on document 302 by the application of rule 305 (i.e., R1). The Dictionary table function 306 operates on document 302 by the application of rule 306 (i.e., R2). A selection operator 308 operates on the result of the application of R2. The selection 308 is followed by a projection 310. Selection 308 and projection 310 are included in the application of rule 311 (i.e., R3).

A natural join operator 312 operates on the result of projection 310 and the result of the Regex table function 304. A selection operator 314 operates on the result of the join 312. Following the selection 314 is a projection operator 316. The join 312, selection 314 and projection 316 are included the application of rule 317 (i.e., R4). Since the WHERE clause of R4 does not contain any selection predicates, the condition in the selection operator 314 is simply true.

A selection operator 318 operates on the result of the projection 316. A projection operator 320 operates on the result of the selection operator 318. The output of the extractor 322 is generated from the result of the projection operator 320 and the second operand (not shown) of the EXCEPT ALL clause in rule 323 (i.e., R5). Since the WHERE clause of R5 does not contain any selection predicates, the condition in the selection operator 318 is simply true.

3. Overall Framework

Given a set of examples in the output of an extractor, each labeled correct or incorrect by a user, embodiments of the present invention generate a ranked list of possible changes to the rules that result in eliminating the incorrect examples from the output, while minimizing effects on the rest of the results and minimizing effects on the rules themselves. A solution provided by embodiments of the present invention operates in two stages: high-level change generation (See Section 5) and low-level change generation (See Section 6).

The high-level change generation step generates a set of high-level changes that may be in the form "remove tuple t from the output of operator Op in the canonical representation of the extractor". Intuitively, removing a tuple t from the output of rule R translates to removing certain tuples involved in the provenance of t according to the canonical operator tree of R. A solution presented herein leverages previous work in data provenance in generating the list of high-level changes. These high-level changes have the potential to remove all incorrect examples from the output. For example, high-level changes for removing the tuple $t_{10}$ from the output of rule R4 would be "remove tuple (Anna, 555-7789) from the output of the join operator in rule R4", or "remove tuple $t_3$ from the output of the Dictionary operator in rule R2".

A high-level change indicates what operator to modify to remove a given tuple from the final output. However, a high-level change does not tell how to modify the operator in order to remove the offending tuple. Determining high-level changes is only a first step towards automating the rule refinement process.

If a rule developer were presented with a set of high-level changes, he or she would need to overcome two major problems in order to translate these high-level changes into usable modifications of the information extraction rule set.

The first problem is one of feasibility: The rule writer cannot directly remove tuples in the middle of an operator graph; he or she is restricted to modifying the rules themselves. It may not be possible to implement a given high-level change through rule modifications, or there may be multiple possible ways to implement the change. Suppose that the Dictionary operator in the example in FIG. 2A has two parameters: The set of dictionary entries and a flag that controls case-sensitive dictionary matching. There are at least two possible implementations of the second high-level change described above: Either remove the entry Anna from the dictionary, or (assuming that the dictionary entries are in title case) enable case-sensitive matching. It is not immediately obvious which of these possibilities is preferable.

The second problem is one of side-effects. A single change to a rule can remove multiple tuples from the output of the rule. If the rule developer chooses to remove the dictionary entry for Anna, then every false positive that matches that entry will disappear from the output of the Dictionary operator. Likewise, if the rule developer enables case-sensitive matching, then every false positive match that is not in the proper case will disappear. In order to determine the dependencies among different high-level changes, the rule developer needs to determine how each high-level change could be implemented and what are the effects of each possible implementation on other high-level changes.

Just as modifying a rule to remove one false positive result can simultaneously remove another false positive result, this action can also remove one or more correct results. There may be instances in the document set where the current set of rules correctly identifies the string "Anna" as a name. In that case, removing the entry "anna" from the dictionary would eliminate these correct results. A given implementation of a high-level change may actually make the results of the rules worse than before.

Following the first step of determining high-level changes, the second step goes beyond the work done in data provenance and shows how to address the issues of feasibility and side-effects. This second step includes the concept of a low-level change (i.e., a specific change to a rule that implements one or more high-level changes). Example low-level changes implementing the two high-level changes above are "Modify the maximum character distance of the Follows join predicate in the join operator of rule R4 from 60 to 50", and "Modify the Dictionary operator of rule R2 by removing entry "anna" from dictionary file first_names.dict", respectively.

Rather than presenting the user with a large and rather unhelpful list of high-level changes, the system disclosed herein produces a ranked list of low-level changes, and may also produce detailed information about the effects and side-effects of each one. Logically speaking, the approach of embodiments disclosed herein works by generating all low-level changes that implement at least one high-level change; then determining, for each low-level change, the corresponding set of high-level changes. This high-level change information may be used to rank the low-level changes.

A naive implementation of the aforementioned approach for presenting a ranked list of low-level changes would be prohibitively expensive, generating huge numbers of possible changes and making a complete pass over the corpus for each one. To keep the computation tractable, a combination of the following two techniques is used: pruning individual low-level changes using information available at the operator level and determining side-effects efficiently using cached provenance information.

Since low-level changes may be expressed in terms of the internal representation of the rules as canonical operator trees, embodiments of the present invention translate the low-level changes back to the level of rule statements prior to showing the low-level changes to the user. It is shown below that there is a direct one-to-one translation between the low-level changes expressed as canonical operator trees and rule statements. For instance, the two aforementioned example low-level changes are presented to the user as "Modify the maximum character distance of the Follows join predicate in the WHERE clause of rule R5 from 60 to 50", and respectively, "Modify the input of the Dictionary table function of rule R2 by removing entry 'anna' from input dictionary file first_names.dict." The user chooses one change to apply, and the entire process is then repeated until the user is satisfied with the resulting rule set.

4. Process for Automatically Refining Rules

Figure 4:
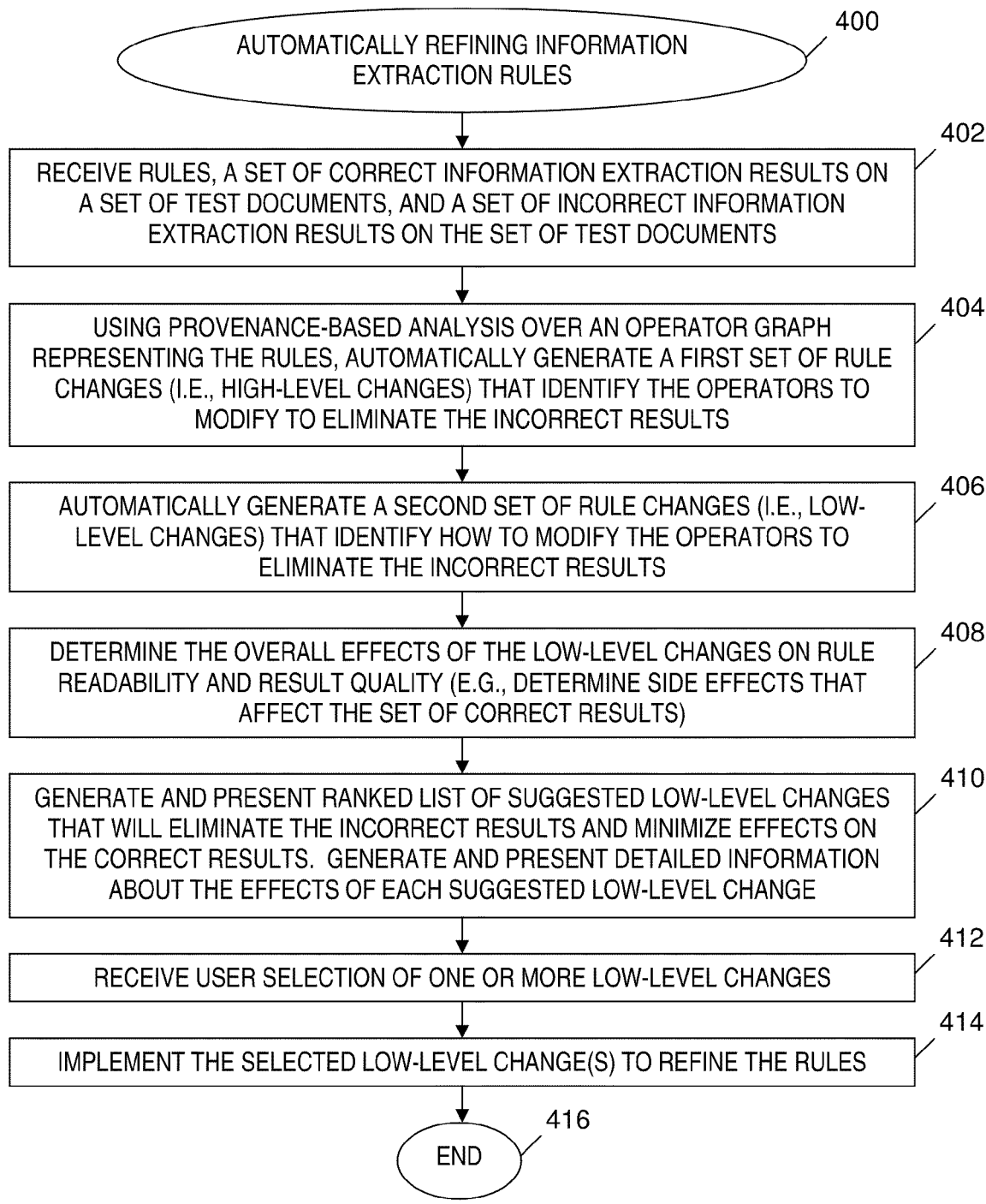
FIG. 4 is a flowchart of a process for automatically refining rules for the system of FIG. 1, in accordance with embodiments of the present invention.

FIG. 4 is a flowchart of a process for automatically refining rules for the system of FIG. 1, in accordance with embodiments of the present invention. The process for automatically refining information extraction rules starts at step 400. In one embodiment, prior to step 402, the rule developer runs the initial set of rules 118 (see FIG. 1) over a set of test documents and then labels the information extraction results in a graphical user interface, producing the set of incorrect results 120 (see FIG. 1) and the set of correct results 122 (see FIG. 1). These sets of incorrect and correct results, the documents and the rules 118 (see FIG. 1) are sent to rule refinement program 106 as input to the automatic rule refinement process.

In step 402, rule refinement program 106 (see FIG. 1) receives the aforementioned test documents, the rules 118 (see FIG. 1), the set of incorrect results 120 (see FIG. 1) and the set of correct results 122 (see FIG. 1). In one embodiment, the incorrect results and correct results are information extraction results on the set of test documents. In one embodiment, the set of incorrect results 120 (see FIG. 1) includes false positive results.

In step 404, rule refinement program 106 (see FIG. 1) uses provenance-based analysis over an operator graph representing the rules received in step 402 to automatically generate a first set of rule changes (i.e., high-level changes) that identify operators to modify to eliminate the incorrect results 120 (see FIG. 1). In one embodiment, the operator graph is a relational algebra representation of the rules received in step 402. In another embodiment, step 404 includes a provenance rewrite directly on the rules received in step 402, thereby allowing the generation of the high-level changes without requiring a transformation of the rules into a relational algebra representation.

In one embodiment, in step 404, the high-level change enumerator 110 (see FIG. 1) determines the provenance of each incorrect result 120 (see FIG. 1). That is, a complete corresponding sequence of rule evaluations that caused each incorrect result to appear in the output of the rules 118 (see FIG. 1) is determined in step 404 by the high-level change enumerator 110 (see FIG. 1). Also in step 404, the high-level change enumerator 110 (see FIG. 1) uses the determined provenance to generate a set of candidate high-level changes that eliminate the incorrect results 120 (see FIG. 1) (e.g., false positive results). Each high-level change describes an abstract change to a rule and the set of rule outputs that would be added or removed by the change. An example of a high-level change is "remove tuple $t_3$ from the output of the Dictionary operator in rule R2." Generating the high-level changes in step 402 is further described in Section 5.

In step 406, rule refinement program 106 (see FIG. 1) automatically generates a second set of rule changes (i.e., low-level changes) that identify how to modify the operators to eliminate the incorrect results 120 (see FIG. 1). The process of generating low-level changes is further described in Section 6.

In one embodiment, in step 406, the low-level change enumerator module 112 (see FIG. 1) generates a set of corresponding low-level changes for each high-level change generated in step 404. A low-level change is a specific and concrete change to the actual rule definition that produces the overall effect described by the corresponding high-level change. An example of a low-level change is: "Modify the input of the Dictionary table function of rule R2 by removing entry 'anna' from input dictionary file first_names.dict."

In one embodiment, step 406 follows a completion of step 404. In another embodiment, the determination of high-level changes in step 404 is interleaved with the determination of low-level changes in step 406 so that the method of FIG. 4 merges the determinations of high-level and low-level changes into a single pass over the provenance graph (e.g., by using a hash table to store a current set of high-level changes as each high-level change is determined).

In step 408, rule refinement program 106 (see FIG. 1) determines the overall effects of the low-level changes generated in step 406, where the overall effects may include effects on the readability and maintenance of rules 118 (see FIG. 1) and the quality of the results of the information extraction. In one embodiment, step 408 includes determining side-effects that affect the set of correct results 122 (see FIG. 1).

In step 410, rule refinement program 106 (see FIG. 1) generates and presents to a user (e.g., rule developer) a ranked list of suggested low-level changes that will eliminate the incorrect results 120 (see FIG. 1) and minimize (or eliminate) effects on the correct results 122 (see FIG. 1). Presenting the ranked list of suggested low-level changes may be done via a GUI on a display coupled to computer system 102 (see FIG. 1). In one embodiment, step 410 also includes rule refinement program 106 (see FIG. 1) generating and presenting to the user detailed information about the effects of each suggested low-level change. Presenting the detailed information in step 410 may also be done via a GUI on a display coupled to computer system 102 (see FIG. 1).

In one embodiment, in step 410, the rank and scoring module 115 (see FIG. 1) evaluates the effects of each low-level change and produces a numeric score. This numeric score is based on a combination of three factors:

Incorrect results removed by the low-level change

Existing correct results inadvertently removed by the low-level change

The severity of the low-level change, in terms of modifications to the rules themselves. In one embodiment, the severity of the low-level change is based on the resulting readability and maintainability of the rules resulting from the low-level change.

The ranking and scoring module 115 (see FIG. 1) uses the scoring policy 116 (see FIG. 1) to determine how to measure each of the above-listed three factors and the ranking policy 117 (see FIG. 1) to determine how to compute a single numeric score that is assigned to a corresponding low-level change.

In step 412, rule refinement program 106 (see FIG. 1) receives a user's selection of one or more low-level changes based on the ranked list of suggested low-level changes presented in step 410.

In step 414, rule refinement program 106 (see FIG. 1) implements the low-level change(s) selected in step 412 to refine the rules 118 (see FIG. 1). The process of FIG. 4 ends at step 416.

5. High-Level Changes

DEFINITION 5.1 (HIGH-LEVEL CHANGE). Let t be a tuple in an output table V. A high-level change for t is a pair (t', Op), where Op is an operator in the canonical operator graph of V and t' is a tuple in the output of Op such that eliminating t' from the output of Op by modifying Op results in eliminating t from V.

For the removal of t' from the output of Op to result in eliminating t from the final output, it must be that t' contributes to generating t. In other words, t' is involved in the provenance of t according to the rule set. Hence, to generate all possible high-level changes for t, the provenance of t must be computed first.

5.1 Computing Provenance

In the field of data provenance, various definitions have been proposed for describing the provenance of a tuple t in the result of a query Q: why-provenance (i.e., the set of source tuples that contribute to the existence of t in the result), where provenance (i.e., the locations in the source database where each field of t has been copied from), and how-provenance (i.e., the source tuples, and how they were combined by operators of Q to produce t). Among the aforementioned definitions, how-provenance is the more complete version, since it generalizes why-provenance, and "contains" where-provenance in a certain sense. How-provenance is also the most suitable in the context of the present invention, since knowing which source tuples and how the source tuples have been combined by Q to generate an undesirable output tuple t is a prerequisite to modifying Q in order to remove t from the result. Therefore, how-provenance extended to handle text-specific operators (e.g., Regex, Dictionary) is used herein.

Given a set of rules Q and input document collection D, a conceptual procedure for computing how-provenance at the level of the operator graph of Q is as follows. Each tuple passing through the operator graph (i.e., source tuple, intermediate tuple, or output tuple) is assigned a unique identifier. Furthermore, each operator "remembers," for each of its output tuples t, precisely those tuples in its input responsible for producing t. This procedure can be thought of as constructing a provenance graph for Q on D that contains an edge $\{t_1, \ldots, t_n\} \stackrel{op}{\to} t$ for each combination $\{t_1, \ldots, t_n\}$ of input tuples to operator Op, and their corresponding output tuple t. This provenance graph essentially embeds the provenance of each tuple t in the output of Q on D.

Figure 5:
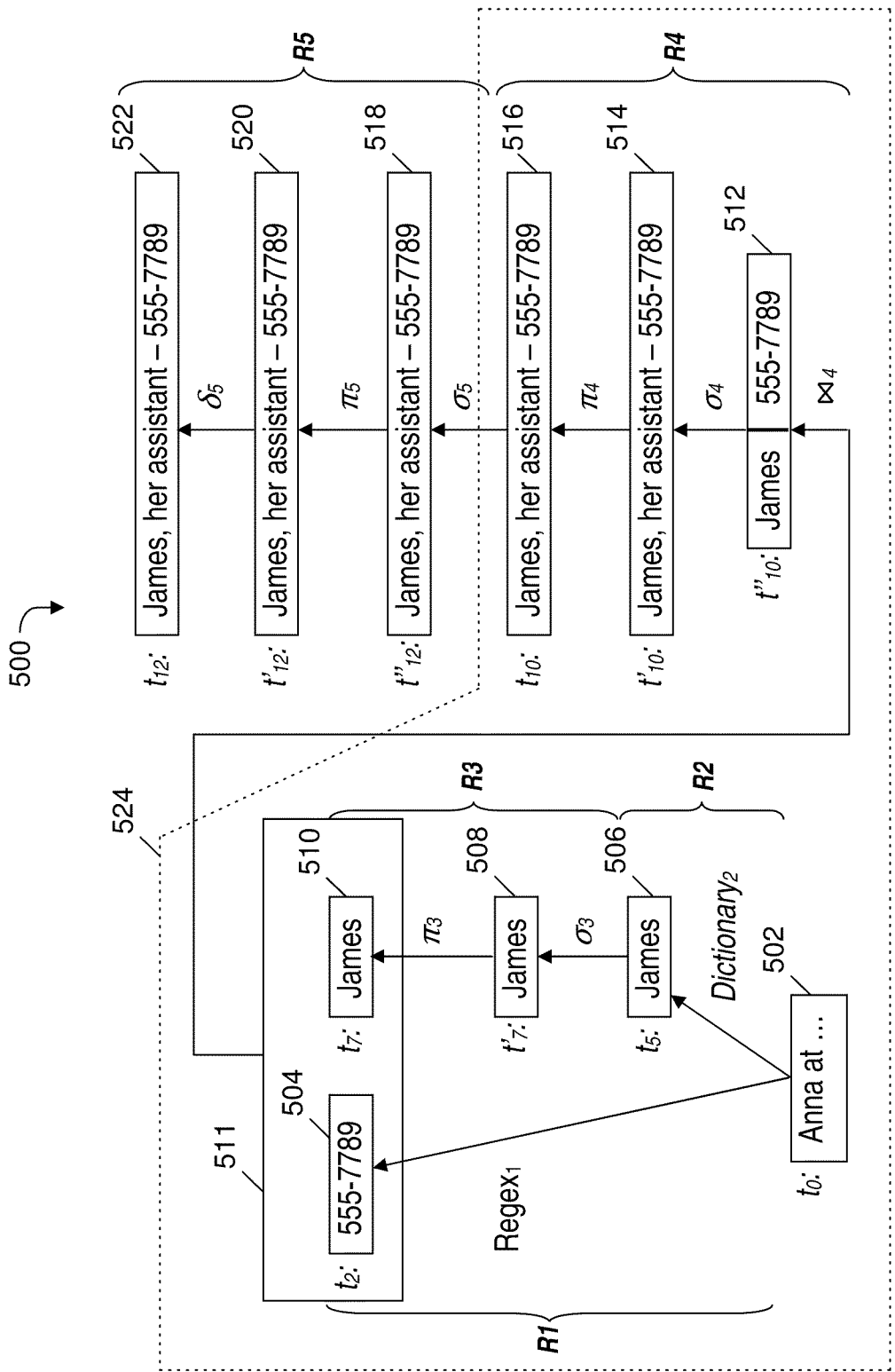
FIG. 5 depicts provenance of a tuple in FIGS. 2A-2B at the level of the operator graph in FIG. 3, in accordance with embodiments of the present invention.

As an example, FIG. 5 shows the portion of the provenance graph for the example in FIGS. 2A-2B that embeds the provenance of tuple $t_{12}$. Example 500 includes tuple $t_0$, which is the text from the input document (see FIG. 2B). By applying rule R1, the Regex table function operates on tuple 502 (i.e., $t_0$) to obtain tuple 504 (i.e., $t_2$). By applying rule R2, the Dictionary table function operates on tuple $t_0$ to obtain tuple 506 (i.e., $t_5$).

By applying rule R3, selection and projection operators generate tuples 508 (i.e., $t'_7$) and 510 (i.e., $t_7$), respectively. By applying rule R4, the result 511 of applying R1, R2 and R3 is operated on by a natural join operator to generate tuple 512 (i.e., $t''_{10}$). The application of R4 also includes a selection operator generating tuple 514 (i.e., $t'_{10}$) and a projection operator generating tuple 516 (i.e., $t_{10}$).

By applying rule R5, a selection operator operates on tuple $t_{10}$ to generate tuple 518 (i.e., $t''_{12}$). The application of R5 also includes a projection operator generating tuple 520 (i.e., $t'_{12}$), followed by tuple 522 (i.e., $t_{12}$).

A procedural definition for the notion of a provenance graph is presented below in Section 10.

To compute the provenance graph, embodiments of the present invention may use a query rewrite approach similar to query rewrite approach in B. Glavic and G. Alonso, "Perm: Processing provenance and data on the same data model through query rewriting" in *Proceedings of the 25th International Conference on Data Engineering*, pages 174-185, 2009 (hereinafter, "the Perm article). In the query rewrite approach in the Perm article, an SQL query Q is rewritten into a provenance query $Q^p$ by recursively rewriting each operator in the relational algebra representation of Q. The rewritten version of each operator Op preserves the result of the original operator, but adds additional provenance attributes through which information about the input tuples to Op that contributed to the creation of an output tuple is propagated. Given Op and a tuple t in the output of Op, the additional information is sufficient to reconstruct exactly those tuples in the input of Op that are responsible for generating t. Conceptually, the provenance query $Q^p$ records the flow of data from input to output through the operator graph of Q, and thus it essentially computes the provenance graph of Q for a given input document collection. The implementation of embodiments of the present invention extends the rewrite approach of the Perm article to handle text-specific operators. The details of the extensions to the aforementioned rewrite approach to handle text-specific operators will be apparent to those skilled in the art.

In other embodiments, the provenance graph may be determined by applying a query rewrite directly on the rules, thereby not requiring a relational algebra representation of the rules.

5.2 Generating High-Level Changes

Given a set of rules Q, an input document collection D and a set of false positives in the output of Q on D, an algorithm GenerateHLCs for generating high-level changes proceeds as follows. First, the provenance graph of Q and D is recorded using the query rewrite approach outlined in Section 5.1. Second, for each false positive t, the algorithm traverses the provenance graph starting from the node corresponding to t in depth-first order, following edges in reverse direction. For every edge $\{\ldots\} \xrightarrow{op} t'$ encountered during the traversal, one high-level change "remove t' from the output of Op" is generated.

Suppose the algorithm GenerateHLCs is invoked on rules R1 to R4, with negative output tuple $t_{10}$ and input document from FIG. 2B. Intuitively, the algorithm GenerateHLCs traverses the provenance graph starting from $t_{10}$ thus visiting each node in the provenance of $t_{10}$ (see the region 524 indicated by the dashed lines in FIG. 5), and outputs the following high-level changes: $(t_{10}, \pi_4)$, $(t'_{10}, \sigma_4)$, $(t''_{10}, \bowtie_4)$, $(t_2, \text{Regex}_1)$, $(t_7, \pi_3)$, $(t'_7, \sigma_3)$, $(t_5, \text{Dictionary}_2)$. Pseudocode 600 in FIG. 6 is the pseudocode of the GenerateHLCs algorithm, which determines a set of high-level changes, given a set of rules Q, an input document collection D and a set of false positives in the output of Q on D.

6. Low-Level Changes

In terms of the relational algebra, a low-level change is defined as the change to the configuration of a single operator, or insertion of a new operator subtree in between two existing operators. Examples include changing the numerical values used in a join condition or a WHERE clause. Notice that the space of all low level changes is unlimited. In order to make the problem tractable, the following discussion is limited to low-level changes that restrict the set of results returned by the query because users generally start with a query with high recall and progressively refine it to improve the precision.

6.1 Generating Low-Level Changes

Given a set of high-level changes, embodiments of the present invention generate a corresponding set of low-level changes, along with enough information about the effects of these changes to rank the low-level changes. One semi-naive way to determine these low-level changes is to iterate over the operators in the canonical relational algebra representation of the annotator, performing the following three steps:

1. For each operator, consider all the high-level changes that can be applied at that operator.
2. For each such high-level change, enumerate all low-level changes that cause the high-level change.
3. For each such low-level change, determine the set of tuples that the low-level change removes from the operator's output.
4. Propagate the removals from step 3 up through the provenance graph to determine the end-to-end effects of each change.

The semi-naïve approach presented above determines the correct answer, but it would be extremely slow. This intractability stems directly from the two challenges of using a set of high-level changes that was discussed in Section 3: feasibility and side-effects.

First, the feasibility problem makes step 2 intractable. Just as there could be no feasible low-level change that implements a given high-level change, there could easily be a nearly infinite number of them. For example, consider a high-level change to remove one of the output tuples of a dictionary operator. Suppose that the dictionary has 1000 entries, one of which produces the tuple. By choosing different subsets of the other 999 entries, one can generate $2^{999}-1$ distinct low-level changes, any of which removes the desired tuple.

This aspect of feasibility is addressed herein by limiting the changes that rule refinement program 106 (see FIG. 1) considers to be a set that is of tractable size, while still considering all feasible combinations of high-level changes at a given operator. In particular, rule refinement program 106 (see FIG. 1) generates, for each operator, a single low-level change for each of the k best possible combinations of high-level changes, where k is the total number of changes that the system will present to the user. These constraints are enforced through careful design of the algorithms for generating individual types of low-level changes, as described in Section 6.2.

The side-effects problem causes problems at step 4 of the semi-naive approach presented above. Traversing the provenance graph is clearly better than re-running the annotator to compute the effects of each change. However, even if the approach presented above generates only one low-level change per operator, the overall cost of this approach is still $O(n^2)$, where n is the size of the operator tree. Such a computation rapidly becomes intractable, as moderately complex annotators may have hundreds or thousands of operators.

The aforementioned complexity may be reduced from quadratic to linear time by leveraging the algorithm for enumerating high-level changes (see Section 5.2 and FIG. 6). The algorithm in Section 5.2 starts with a set of undesirable output tuples and produces, for each input tuple, a set of high-level changes that would remove the tuple. This algorithm is easily modified to remember the mapping from each high-level change back to the specific output tuple that the high-level change removes.

By running the modified algorithm (i.e., the algorithm that remembers the mapping from each high-level change back to the specific output tuple that the change removes) over every output tuple, including the correct outputs, the end-to-end effects of any possible side-effect of a low-level change are pre-computed. With a hash table of pre-computed dependencies, the end-to-end effects of a given low-level change are determined in time proportional to the number of tuples the low-level change removes from the local operator.

Figure 7:
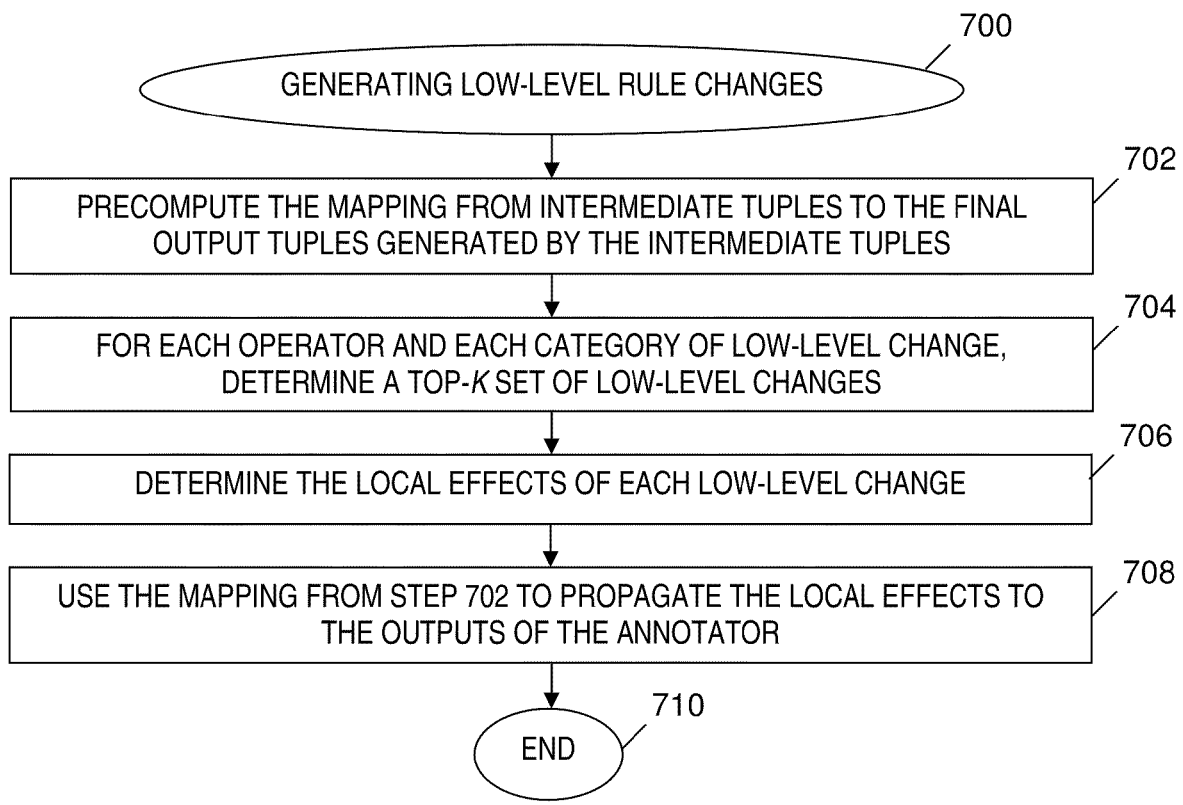
FIG. 7 is a flowchart of a process for generating low-level changes in the process of FIG. 4, in accordance with embodiments of the present invention.

Applying the optimizations described above to the semi-naive algorithm yields the steps in the process for generating low-level changes, as shown in FIG. 7. The process of generating low-level changes, as included in step 406 in FIG. 4, starts at step 700 in FIG. 7. In step 702, rule refinement program 106 (see FIG. 1) determines the mapping from intermediate tuples to the final output tuples generated by the intermediate tuples.

In step 704, for each operator and each category of low-level change, rule refinement program 106 (see FIG. 1) determines a top-k set of low-level changes.

In step 706, rule refinement program 106 (see FIG. 1) determines the local effects of each low-level change in the top-k set determined in step 704.

In step 708, rule refinement program 106 (see FIG. 1) uses the mapping from step 702 to propagate the local effects determined in step 706 to the outputs of the annotator. The process of FIG. 7 ends at step 710.

Section 6.2 describes the details of how step 704 is performed.

6.2 Specific Classes of Low-Level Change

This section describes specific types of low-level changes that embodiments of the present invention implement via change generator modules 114 (see FIG. 1), along with techniques used to efficiently generate the low-level changes.

Modify numerical join parameters. This subsection uses the predicate function Follows as an example for all joins based on numerical values. Recall that Follows(span$_1$, span$_2$, n$_1$, n$_2$) returns true if span$_1$ is followed by span$_2$ by a distance value in the range of [n$_1$, n$_2$]. Low-level changes to a Follows predicate involve shrinking the range of character distances by moving one or both of the endpoints (i.e., n$_1$ and/or n$_2$).

Generating low-level changes for numerical join predicates may be implemented by a first change generator module included in modules 114 (see FIG. 1) and involves interleaving the computation of side-effects with the process of iterating over possible numerical values. A goal of the rule refinement program 106 (see FIG. 1) is to produce a ranked list of low-level changes, where as compared to a lower-ranked low-level change, a higher-ranked low-level change produces a greater improvement in result quality according to an error metric. This ranking function is used by the first change generator module to compute a utility value for each value in the range and to remove those values in the range with low utility. In particular, utility is computed by probing each value in the range: remove the value, propagate the change to the output, and compute the change in result quality.

Subsequent to probing each value in the range, the first change generator module finds the top-k sub-sequences in [n$_1$, n$_2$] that correspond to a maximum summation of utility values. This problem can be solved with Kadane's algorithm in O(nk) time, where n is the number of values, and k is the number of ranges to find. In general, Kadane's algorithm includes a scan through array values, computing at each position the maximum subarray ending at that position. This subarray is either empty and its sum is zero, or the subarray consists of one more elements than the maximum subarray ending at the previous position.

Remove dictionary entries. Another important class of low-level change involves removing entries from a dictionary file so as to remove the corresponding dictionary matches from the annotator's input features. A second change generator module included in modules 114 (see FIG. 1) implements this type of dictionary entry removal based low-level change by taking advantage of the fact that each dictionary entry produces a disjoint set of tuples at the output of the Dictionary operator.

As with numerical join parameters, the generation of low-level changes is interleaved with the process of determining the effects of each change and the resulting improvement in utility. The second change generator module groups the outputs of the Dictionary operator by dictionary entry. For each dictionary entry that matches at least one high-level change, the second change generator module determines the tuples that would disappear from the final query result if the dictionary entry was removed. The second change generator module ranks the dictionary entries according to the effect that removing that entry would have on result quality. Following the ranking according to effect of removal, the second change generator module generates a low-level change for the top 1 entry, the top 2 entries, and so on, up to k entries.

Add filtering dictionary. A third change generator module included in the modules 114 (see FIG. 1) generates new dictionaries and uses the new dictionaries to filter spans based on the presence of dictionary matches in close proximity. These filtering predicates are produced by composing a span operation such as LeftContextTok with a dictionary predicate such as Not (ContainsDict( )), as in rule R3 in FIG. 2A.

To generate filtering predicates, the third change generator module considers the tokens to the left or right of each span in a tuple affected by a high-level change. The union of these token values forms a set of potential dictionary entries. The third change generator module ranks the effects of filtering with these dictionary entries in the same way that the aforementioned changes involving removal of dictionary entries are ranked. Specifically, the third change generator module may group tuples together according to which dictionary entries occur in the vicinity of their spans, and then determine the effect of each potential entry on end-to-end result quality.

Add filtering view. The last class of low-level changes listed herein involves using subtraction to add a filter view on top of an existing view V. A fourth change generator module included in modules 114 (see FIG. 1) implements this add filtering view type of change by removing spans from V that overlap with, contain, or are contained in some span of the filtering view. As an example, rule R5 in FIG. 2A implements a filtering view on top of PersonPhoneAll. To generate filtering views, the fourth change generator module considers every pair of views V$_1$ and V$_2$ such that V$_1$ and V$_2$ are not descendants of one another in the canonical representation of the rule set. For each filter policy (OVERLAP, CONTAINS, or CONTAINED) the fourth change generator module identifies the tuples of V$_1$ that are in relationships with at least one V$_2$ span according to the policy, and ranks the resulting filters according to their effects on the overall end-to-end result quality.

7. Experiments

This section presents an experimental study of system 100 (see FIG. 1) (hereinafter in this section referred to as "the system") in terms of performance, and quality of generated rule refinements.

The Person extraction rule set consists of 14 complex rules for identifying person names by combining basic features such as capitalized words and dictionaries of first and last names. Example rules include "Capitalized Word followed by FirstName", or "LastName followed by a comma, followed by Capitalized Word". Rules are also included for identifying other named entities such as Organization, Address, Email-Address, which can be used only as filtering views, in order to enable refinements commonly needed in practice, where person, organizations and locations interact with each other in various ways (e.g., "Georgia" may be a person, or a U.S. state).

The PersonPhone extraction rule set consists of 11 complex rules for identifying phone numbers and extension numbers, and a single rule "Person followed within 0 to 60 characters by Phone" for identifying candidate person-phone relationships (as in rule R4 from FIG. 2A). To evaluate the system disclosed herein on the relationship task, a high-quality Person extractor is used to identify person names in the PersonPhone task. Note that the system is evaluated separately on the Person task, and so the focus is on the relationship extractor for the PersonPhone task.

Datasets. Section 11 lists the characteristics of the following datasets used in the evaluation:

ACE: collection of newswire reports and broadcast news and conversations with Person labeled data from the Automatic Content Extraction 2005 Evaluation (ACE05) Dataset.

Enron and EnronPP: collections of emails from the Enron corpus that have been annotated with true Person and respectively PersonPhone labels.

Set Up. The rule refinement approach disclosed herein is developed on top of SystemT v0.3.6, the information extraction system developed by International Business Machines Corporation, enhanced with a provenance rewrite engine as described in Section 5.1. The experiments were run on an Ubuntu® Linux version 9.10 with 2.26 GHz Intel® Xeon® CPU and 8 GB of RAM. All experimental results, unless otherwise stated, are from a 10-fold cross-validation.

7.1 Quality Evaluation

A goal of the quality evaluation is to validate that the system generates refinements that are of high quality in that: 1) they improve the precision of the original rules, while keeping the recall fairly stable, and 2) they are comparable to refinements that a human expert would identify. In doing so, the quality of refinements produced by the system are evaluated on a variety of datasets, and a user study is conducted in which a rule refinement task is presented to a pair of human experts and their actions are compared against those suggested by the system.

Experiment 1. In this experiment, the system is run for k iterations starting from the baseline rule set. After each iteration, the refinement with the highest improvement in F1-measure on the training set is automatically applied. Table 1 shows the F1-measure achieved on the test set of various datasets with the refined rule sets for the Person and PersonPhone tasks, when k is varied from 1 to 5. As can be seen, the system achieves improvements in F1-measure between 6% and 26% after only a few iterations. Tables 2 and 3 show precision and recall, respectively. The improvement in F1-measure does not arise at the expense of recall. Indeed, as shown in Tables 2 and 3 for the Enron and EnronPP datasets, the precision after 5 iterations improves greatly when compared to the baseline rule set, while the recall decreases only marginally.

TABLE 1

F1 Score After Each Iteration of Change

| Data Set | Initial Score | 1 Iteration | 2 Iterations | 3 Iterations | 4 Iterations | 5 Iterations |
|---|---|---|---|---|---|---|
| Enron | 0.479 | 0.650 | 0.710 | 0.728 | 0.732 | 0.737 |
| ACE | 0.358 | 0.467 | 0.512 | 0.543 | 0.568 | 0.576 |
| EnronPP | 0.408 | 0.467 | 0.469 | 0.470 | 0.470 | 0.471 |

TABLE 2

Precision After Each Iteration of Change

| Data Set | Initial Score | 1 Iteration | 2 Iterations | 3 Iterations | 4 Iterations | 5 Iterations |
|---|---|---|---|---|---|---|
| Enron | 0.335 | 0.536 | 0.633 | 0.656 | 0.713 | 0.727 |
| ACE | 0.336 | 0.476 | 0.598 | 0.631 | 0.671 | 0.713 |
| EnronPP | 0.394 | 0.512 | 0.550 | 0.571 | 0.592 | 0.611 |

TABLE 3

Recall After Each Iteration of Change

| Data Set | Initial Score | 1 Iteration | 2 Iterations | 3 Iterations | 4 Iterations | 5 Iterations |
|---|---|---|---|---|---|---|
| Enron | 0.840 | 0.826 | 0.808 | 0.817 | 0.752 | 0.747 |
| ACE | 0.371 | 0.368 | 0.354 | 0.346 | 0.345 | 0.341 |
| EnronPP | 0.394 | 0.411 | 0.409 | 0.400 | 0.389 | 0.383 |

Experiment 2. In this experiment the top refinements generated by the system are compared with those devised by human experts. For this purpose, a user study was conducted in which two experts A and B were given one hour to improve the rule set for the Person task using the training set in the Enron dataset. Both experts are professional information extraction rule developers. To ensure a fair comparison, the experts were restricted to types of rule refinements supported in the current implementation, as described in Section 6.2.

Table 4 shows the refinements of the two experts and the F1-measure improvement achieved after each refinement on the test set for expert A. (Expert B's refinements are a subset of expert A's.) Table 4 also shows the rank of each expert refinement in the list automatically generated by the system in the first iteration (i.e., $I_1$), as well as the second iteration (i.e., $I_2$) after applying the topmost refinement. It was observed that the top refinement suggested by the system (i.e., remove person candidates strictly contained within other person candidates) coincides with the first refinement applied by both experts (i.e., $A_1$ and $B_1$). Furthermore, with a single exception, all expert refinements appear among the top 12 results generated by the system in the first iteration. The dictionary filter generated in iteration 1 consisted of 12 high-quality entries incorrectly identified as part of a person name (e.g., "Thanks", "Subject", "From"). It contains 27% of all entries in corresponding refinement $A_2$, and all entries in the filter dictionary on person candidates of $B_4$. Furthermore, in both iterations, the system generated a slightly better refinement compared to $A_4$ and $A_5$ that filters all person candidates overlapping with a double new line. This achieves the combined effect of $A_4$ and $A_5$, while producing a refined rule set with a slightly simpler structure (a single filter, instead of two).

TABLE 4

Expert refinements and their ranks in the list of generated refinements after iterations 1 and 2 ($I_1$, $I_2$)

| ID | Description | P | R | F1 | $I_1$ | $I_2$ |
|---|---|---|---|---|---|---|
| | Baseline | 35.2 | 85.0 | 49.8 | | |
| $A_1$, $B_1$ | Filter Person by Person (CONTAINED) | 57.3 | 83.7 | 68.0 | 1 | n/a |
| $A_2$ | Dictionary filter on CapsPerson | 70.3 | 83.9 | 76.5 | 4 | 4 |
| $A_3$, $B_4$ | Dictionary filter on Person | 71.8 | 83.8 | 77.4 | | |
| $A_4$ | Filter PersonFirstLast by DblNewLine (OVERLAP) | 72.6 | 84.0 | 77.9 | 9* | 5* |

TABLE 4-continued

Expert refinements and their ranks in the list of generated refinements after iterations 1 and 2 ($I_1$, $I_2$)

| ID | Description | P | R | F1 | $I_1$ | $I_2$ |
|---|---|---|---|---|---|---|
| $A_5$ | Filter PersonLastFirst by DblNewLine (OVERLAP) | 72.7 | 84.1 | 78.0 | 9* | 5* |
| $A_6, B_2$ | Filter PersonLastFirst by PersonFirstLast (OVERLAP) | 73.5 | 84.1 | 78.4 | 5 | 3 |
| $A_7, B_3$ | Filter Person by Org (OVERLAP) | 74.1 | 82.5 | 78.0 | 3 | 1 |
| $A_8$ | Filter Person by Address (OVERLAP) | 74.3 | 82.4 | 78.1 | 11 | 9 |
| $A_9$ | Filter Person by EmailAddress (OVERLAP) | 77.3 | 81.7 | 79.4 | 12 | 6 |

The list of generated refinements also contains refinements not identified by the experts. For example, the system suggested a dictionary filter on one token to the right of person candidates containing many initials. This is due to the baseline rule set not identifying candidate persons with a middle initial. As a consequence, many partial names that overlap with correct names (e.g., "James" and "James A. Smith") are considered false positives by the system. While not useful at a first glance, it is noted that such a refinement may be helpful in improving the recall of the rule set, by signaling to the developer additional person candidate rules based on contextual clues. Based on the observations above, it is reasonable to conclude that the system is capable of generating rule refinements that are comparable in quality to those generated by human experts.

7.2 Performance Evaluation

A goal of the performance evaluation described in this section is two-fold: to validate that the algorithm for generating low-level changes is tractable, since it should be clear that without the optimizations in Section 6, CPU cost would be prohibitive, and to show that the system can automatically generate refinements faster than human experts.

Table 5 shows the running time of the system in the first 3 iterations with the Person rule set on the Enron dataset, when the size of the training data is varied between 100 and 400 documents.

TABLE 5

| Train Set #documents | $I_1$ (sec) | $I_2$ (sec) | $I_3$ (sec) | F1 after $I_3$ (%) |
|---|---|---|---|---|
| 100 | 35.3 | 1.8 | 1.1 | 74.9 |
| 200 | 44.5 | 6.0 | 4.2 | 70.2 |
| 300 | 72.9 | 9.9 | 6.3 | 72.1 |
| 400 | 116.4 | 21.3 | 13.6 | 70.0 |

As shown in Table 5, the system takes between 0.5 and 2 minutes for the first iteration, which includes the initialization time required for loading the rule operators in memory, running the extractor on the training set, and computing the provenance graph (i.e., operations performed exactly once). Once initialized, the system takes under 20 seconds for subsequent iterations. As expected, the running time in each iteration decreases, since less data is being processed by the system after each refinement. Also note that the F1-measure of the refined rule set after iteration 3 (see the last column of Table 5) varies only slightly with the size of the training set.

It is noted that in each iteration the system sifts through hundreds of documents, identifies and evaluates thousands of low-level changes, and finally presents to the user a ranked list of possible refinements, along with a summary of their effects and side-effects. When done manually with known techniques, these tasks require a large amount of human effort. Recall from Experiment 2 that the experts took one hour to devise, implement and test their refinements, and reported taking between 3 and 15 minutes per refinement. In contrast, the system generates almost all of the expert's refinements in iteration 1, in about 2 minutes.

Finally, it is noted that low-level change generation accounts for the bulk of the duration of time that the rule refinement program 106 (see FIG. 1) is run. This portion of task could be easily parallelized, since each combination of operator and low-level change generation module is an independent unit of work. Had this parallelization been done by making use of all 8 cores on the test machine in the experiments of this section, the system would have run an order of magnitude faster with no other modifications.

8. Rule Languages

FIG. 8 depicts examples of a rule expressed in three different information extraction rule languages (i.e., JAPE, AQL and XLog), where the rule is utilized by the system of FIG. 1, in accordance with embodiments of the present invention. FIG. 8 shows three different implementations of the rule: If a match of a dictionary of common first names occurs in the text, followed immediately by a capitalized word, mark the two words as a "candidate person name." Each implementation in FIG. 8 uses a different rule language (i.e., JAPE, AQL or XLog), but all three implementations generate the same output, except in certain corner cases.

In general, information extraction rule languages often have very different syntaxes. There are also some differences between languages in terms of their overall expressive power. However, most rule languages in common use share a large set of core functionality. Furthermore, the common core functionality of most information extraction rule languages can be expressed as standard SQL, with a few text-specific extensions described in Section 9.

9. Additions to SQL

In the examples described herein, the standard set of SQL functions is augmented with the following text-specific functions:

1. Predicates and scalar functions for manipulating spans, used for expressing join and selection predicates, and creating new values in the SELECT clause of a rule; and
2. Table functions for performing three crucial information extraction tasks: regular expression matching, dictionary matching, and deduplication of overlapping spans.

FIG. 9 is a table of text-specific predicate, scalar and table functions added to SQL for expressing rules utilized by the system of FIG. 1, in accordance with embodiments of the present invention. Table 900 lists the text-specific additions to SQL, along with a brief description of each.

The ability to perform character-level regular expression matching is fundamental in any information extraction system, as many basic extraction tasks such as identifying phone numbers or Internet Protocol (IP) addresses can be achieved using regular expressions. For the example rule in FIG. 8, regular expression matching is appropriate for identifying capitalized words in the document, and is expressed, for instance, in lines 5-6 of the AQL implementation and line 5 of the XLog implementation (see FIG. 8).

For the purpose of character-level regular expression matching, the SQL is augmented herein with the Regex table function (See FIG. 9), which takes as input a regular expression, a relation name R, and an attribute of type span A of R, and computes an instance with a single span-typed attribute called match containing all matches of the given regular expression on the A values of all tuples in R.

A second fundamental information extraction functionality is dictionary matching: the ability to identify in an input document all occurrences of a given set of terms specified as entries in a dictionary file. Dictionary matching is useful in performing many basic extraction tasks such as identifying person salutations (e.g., "Mr", "Ms", "Dr"), or identifying occurrences of known first names (e.g., See FIG. 8, line 4 of the JAPE implementation, lines 3-4 of the AQL implementation, and line 3 of XLog implementation). For the purpose of dictionary matching, the SQL is augmented herein with the Dictionary table function that takes as input the name of a dictionary file, a relation name R, and an attribute of type span A of R, and computes an instance with a single span-typed field called match containing all occurrences of dictionary entries on the A values of all tuples in R.

A third component of information extraction rules is a toolkit of span operations. Table 900 in FIG. 9 lists the text-based scalar functions that the system uses to implement various operations over the span type. Note the distinction between scalar functions that return a Boolean value (e.g., Follows) and can be used as join predicates, and scalar functions that return non-Boolean values (e.g., Merge), used as selection predicates, and to create new values in the SELECT clause of rules.

10. Provenance Associated with Operations

Definition 10.1 presented below formalizes the notion of provenance graph used herein. Note that the intention of the formalism below is not to propose yet another definition for provenance. In fact, when restricted to the Select-Project-Join-Union (SPJU) fragment of SQL, Definition 10.1 corresponds to the original definition of how-provenance. Rather, a goal of presenting Definition 10.1 is to provide a pictorial representation of provenance that can be used in discussing the algorithm for computing high-level changes.

DEFINITION 10.1 [Provenance graph] Let Q be a set of rules and D be a document collection. The data flow graph of Q and D, or in short, the data flow graph of Q when D is understood from the context, is a hypergraph G(V, E), where V is a set of hypervertices, and E is a set of hyperedges, constructed as follows. For every operator Op in the canonical representation of Q:

If $Op=Regex_{(regex,A)}(R)$, or $Op=Dictionary_{dict\_file,A}(R)$, then for every $t \in R$ and every output tuple $t' \in Op(t)$, V contains vertices $v_t$, $v_{t'}$, and E contains edge $v_t \xrightarrow{Op} v_{t'}$. The provenance of t' according to Op is t.

If $Op=\pi_A(R)$, where A is a set of attributes, then for every $t \in R$ and corresponding output tuple $t'=\pi_A(t)$, V contains vertices $v_t$, $v_{t'}$, and E contains edge $v_t \xrightarrow{\pi_A} v_{t'}$. The provenance of t' according to $\pi_A$ is t.

If $Op=\sigma_C(R)$, where C is a conjunction of selection predicates, then for every $t \in R$ and corresponding output tuple $t'=\sigma_C(t)$ (if any), V contains vertices $v_t$, $v_{t'}$, and E contains edge $v_t \xrightarrow{\sigma_C} v_{t'}$. The provenance of t' according to $\sigma_C$ is t.

If $Op=\bowtie_C(R_1, \ldots, R_n)$, where C is a conjunction of join predicates, then for every $t_1 \in R_1, \ldots, t_n \in R_n$ and corresponding output tuple $t'=\bowtie(t_1, \ldots, t_n)$ (if any), V contains vertices $v_{t_1}, \ldots, v_{t_n}$ and hypervertex $\{v_{t_1}, \ldots, v_{t_n}\}$ and E contains hyperedge $\{v_{t_1}, \ldots, v_{t_n}\} \bowtie v_{t'}$. The provenance of t' according to $\bowtie_C$ is $\{t_1, \ldots, t_n\}$.

If $Op=\cup(R_1, R_2)$, then for every $t_1 \in R_1$ (or $t_2 \in R_2$) and corresponding output tuple $t' \in \cup(\{t_1\}, \emptyset)$ (or respectively, $t' \in \cup(\emptyset, \{t_2\})$), V contains vertices $v_{t_1}$ (or $v_{t_2}$) and $v_{t'}$, and E contains edge $v_{t_1} \xrightarrow{\cup} v_{t'}$ (respectively, $v_{t_2} \xrightarrow{\cup} v_{t'}$). The provenance of t' according to $\cup$ is $t_1$ (or respectively, $t_2$).

If $Op=\delta(R_1, R_2)$, then for every $t \in R_1$, such that $t \in R_2$ and corresponding output tuple $t' \in \{t\} - R_2$, V contains vertices $v_t$, $v_{t'}$, and E contains edge $v_t \xrightarrow{\delta} v_{t'}$. The provenance of t' according to $\delta$ is t.

11. Evaluation Datasets

Table 6 lists the characteristics of the datasets used in the experiments in Section 7 in terms of number of documents and labels in the train and test sets.

TABLE 6

| Dataset | Train set | | Test set | |
|---|---|---|---|---|
| | #docs | #labels | #docs | #labels |
| ACE | 273 | 5201 | 69 | 1220 |
| Enron | 434 | 4500 | 218 | 1969 |
| EnronPP | 322 | 157 | 161 | 46 |

12. Computer System

Figure 10:
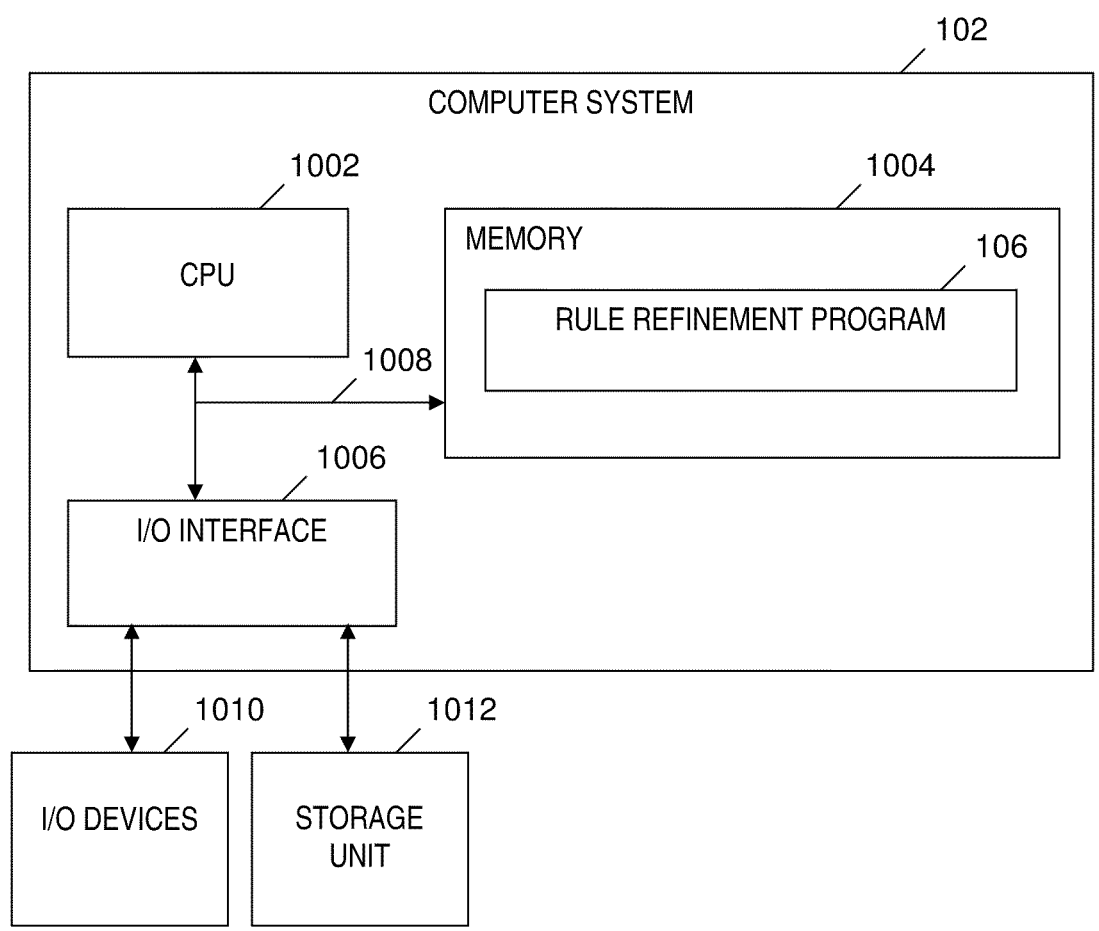
FIG. 10 is a block diagram of a computer system that is included in the system of FIG. 1 and that implements the process of FIG. 4, in accordance with embodiments of the present invention.

FIG. 10 is a block diagram of a computer system that is included in the system of FIG. 1 and that implements the processes of FIG. 4, FIG. 6 and FIG. 7, in accordance with embodiments of the present invention. Computer system 102 generally comprises a central processing unit (CPU) 1002, a memory 1004, an I/O interface 1006, and a bus 1008. Further, computer system 102 is coupled to I/O devices 1010 and a computer data storage unit 1012. CPU 1002 performs computation and control functions of computer system 102. CPU 1002 may comprise a single processing unit, or be distributed across one or more processing units in one or more locations (e.g., on a client and server).

Memory 1004 may comprise any known computer readable storage medium, which is described below. In one embodiment, cache memory elements of memory 1004 provide temporary storage of at least some program code (e.g., program code 106) in order to reduce the number of times code must be retrieved from bulk storage while instructions of the program code are carried out. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN).

I/O interface 1006 comprises any system for exchanging information to or from an external source. I/O devices 1010 comprise any known type of external device, including a display device (e.g., monitor), keyboard, mouse, printer, speakers, handheld device, facsimile, etc. In one embodiment, I/O devices 1010 includes a display device that displays a GUI that is used to enter rules 118 (see FIG. 1), incorrect results 120 (see FIG. 1), and correct results 122 (see FIG. 1), and to present the ranked list of rule refinements 124 (see FIG. 1) to a user of computer system 102. Bus 1008 provides a communication link between each of the components in computer system 102, and may comprise any type of transmission link, including electrical, optical, wireless, etc.

I/O interface 1006 also allows computer system 102 to store and retrieve information (e.g., data or program instructions such as program code 106) from an auxiliary storage device such as computer data storage unit 1012 or another computer data storage unit (not shown). Computer data storage unit 1012 may comprise any known computer readable storage medium, which is described below. For example, computer data storage unit 1012 may be a non-volatile data storage device, such as a magnetic disk drive (i.e., hard disk drive) or an optical disc drive (e.g., a CD-ROM drive which receives a CD-ROM disk).

In one embodiment, storage unit 1012 and/or one or more other computer data storage units (not shown) store an input document (not shown), rules 118 (see FIG. 1), incorrect results 120 (see FIG. 1), correct results 122 (see FIG. 1), and/or the ranked list of rule refinements 124 (see FIG. 1).

Memory 1004 may store computer program code 106 that provides the logic for automatically refining information extraction rules, which is included in the process in FIG. 4. In one embodiment, program code 106 is included in information extraction system 104 (see FIG. 1). Further, memory 1004 may include other systems not shown in FIG. 10, such as an operating system (e.g., Linux) that runs on CPU 1002 and provides control of various components within and/or connected to computer system 102.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 102). Furthermore, an embodiment of the present invention may take the form of a computer program product embodied in one or more computer readable medium(s) (e.g., memory 1004 or computer data storage unit 1012) having computer readable program code (e.g., program code 106) embodied or stored thereon.

Any combination of one or more computer readable medium(s) (e.g., memory 1004 and computer data storage unit 1012) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 106) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 106) embodied on a computer readable medium may be transmitted using any appropriate medium, including but not limited to wireless, wireline, optical fiber cable, RF, etc., or any suitable combination of the foregoing.

Computer program code (e.g., program code 106) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 10. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 4 and FIG. 7) and/or block diagrams of methods, apparatus (systems) (e.g., FIG. 1 and FIG. 10), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 106). These computer program instructions may be provided to a processor (e.g., CPU 1002) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 1004 or computer data storage unit 1012) that can direct a computer (e.g., computer system 102), other programmable data processing apparatus, or other devices to function in a particular manner, such that the instructions (e.g., program 106) stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 106) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of automatically refining information extraction rules. Thus, an embodiment of the present invention discloses a process for supporting computer infrastructure, comprising integrating, hosting, maintaining and deploying computer-readable code (e.g., program code 106) into a computer system (e.g., computer system 102), wherein the code in combination with the computer system is capable of performing a process of automatically refining information extraction rules.

In another embodiment, the invention provides a business method that performs the process steps of the invention on a subscription, advertising and/or fee basis. That is, a service provider, such as a Solution Integrator, can offer to create, maintain, support, etc. a process of automatically refining information extraction rules. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 4 and FIG. 7 and the block diagrams in FIG. 1 and FIG. 10 illustrate the architecture, functionality, and operation of possible implementations of systems, methods, and computer program products according to various embodiments of the present invention. In this regard, each block in the flowchart or block diagrams may represent a module, segment, or portion of code (e.g., program code 106), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically refining rules for information extraction, comprising:
a computer system receiving a plurality of documents, a plurality of rules for information extraction, and a plurality of correct results and a plurality of incorrect results from applying said plurality of rules on said plurality of documents;
said computer system determining a provenance graph of said plurality of rules applied on said plurality of documents, wherein for an operator of said plurality of operators, said provenance graph indicates a sequence of evaluations of a set of rules included in said plurality of rules that generates an output of said operator;
said computer system determining a first set of rule changes (high-level changes) to specify a set of operators of said plurality of operators to be changed to eliminate said incorrect results, wherein said determining said high-level changes is based on said provenance graph;
said computer system determining a second set of rule changes (low-level changes) to specify how to implement said high-level changes, wherein each low-level change specifies a change in a structure of an operator of said set of operators, or specifies an insertion of a new operator subtree in between two operators of said set of operators, wherein said determining said low-level changes includes:
determining a mapping from intermediate tuples to output tuples included in said incorrect results, wherein said intermediate tuples result from said high-level changes;
determining a top-k set of low-level changes for each operator of said set of operators and for a category of a plurality of categories of said low-level changes;
determining local effects of each low-level change of said top-k set of low-level changes; and
propagating said local effects to said output tuples based on said mapping;
said computer system determining effects of said low-level changes on said correct results and on said plurality of rules;
said computer system generating a ranked list of said low-level changes based on said determined effects of said low-level changes; and
a processor of said computer system implementing said low-level changes based on said ranked list, wherein said implementing said low-level changes includes refining said plurality of rules to eliminate said incorrect results and to minimize said determined effects of said low-level changes.

2. The method of claim 1, wherein said determining said top-k set of low-level changes includes determining a corresponding top-k set of low-level changes in a category of said plurality of categories, wherein said category specifies a modification to numerical join parameters $n_1$, $n_2$ that specify a range $[n_1, n_2]$, and wherein said determining said corresponding top-k set of low-level changes includes:
determining a plurality of utility values corresponding to values in said range $[n_1, n_2]$, wherein a utility value of said plurality of utility values corresponds to a value in said range $[n_1, n_2]$ and is based on a change in quality of a result of applying said plurality of rules with said value removed from said range $[n_1, n_2]$; and
determining top-k sub-sequences of said range $[n_1, n_2]$ based on maximum summations of utility values included in said plurality of utility values.

3. The method of claim 1, wherein said determining said top-k set of low-level changes includes determining a corresponding top-k set of low-level changes in a category of said plurality of categories, wherein said category specifies a removal of entries in a dictionary file by removing corresponding entries in said dictionary file from input to said plurality of rules, and wherein said determining said corresponding top-k set of low-level changes includes:
grouping outputs of a Dictionary operator by entry in said dictionary file;
for each entry in said dictionary file that matches at least one high-level change, determining tuples that are eliminated from a result of applying said plurality of rules based on a removal of an entry in said dictionary file;

ranking said entries in said dictionary file according to an effect that removing each entry has on quality of said result; and generating a low-level change for the top 1 entry, the top 2 entries, . . . , up to the top k entries based on said ranking said entries.

4. The method of claim 1, wherein said determining said top-k set of low-level changes includes determining a corresponding top-k set of low-level changes in a category of said plurality of categories, wherein said category specifies an addition of a new filtering dictionary that filters spans based on a presence of matches of entries of said dictionary file in close proximity, and wherein said determining said corresponding top-k set of low-level changes includes:

identifying tokens to the left and to the right of each span in a tuple affected by a high-level change of said high-level changes;

determining potential entries of said dictionary file by performing a union of said tokens;

ranking said potential entries according to an effect on quality of a result of applying said plurality of rules by filtering with said potential entries; and generating said top-k set of low-level changes based on said ranking said potential entries.

5. The method of claim 1, wherein said determining said top-k set of low-level changes includes determining a corresponding top-k set of low-level changes in a category of said plurality of categories, wherein said category specifies an addition of a filtering view, and wherein said determining said corresponding top-k set of low-level changes includes:

identifying each pair of views V1 and V2 such that V1 and V2 are not descendants of one another in a relational algebra representation of said plurality of rules;

for each filter policy selected from the group consisting of Overlap, Contains and Contained, identifying tuples of V1 that are in relationships with at least one span in V2;

ranking filters resulting from said identifying said tuples of V1, wherein said ranking filters is based on an effect on quality of a result of applying said plurality rules; and generating said top-k set of low-level changes based on said ranking said filters.

6. The method of claim 1, wherein said determining said provenance graph of said plurality of rules includes rewriting an SQL query Q representing said plurality of rules into a provenance query $Q^P$ by recursively rewriting each operator Op in a relational algebra representation of Q, wherein said recursively rewriting Op in Q preserves a result of Op along with additional provenance attributes through which information about input tuples to Op that contributed to a creation of an output tuple is propagated, and wherein given Op and a tuple t in said result of Op, said additional provenance attributes are sufficient to reconstruct tuples included in said input tuples that are responsible for generating said tuple t.

7. A computer system comprising:

a processor; and a computer-readable memory unit coupled to said processor, said memory unit containing instructions that when carried out by said processor implement a method of automatically refining rules for information extraction, said method comprising:

receiving a plurality of documents, a plurality of rules for information extraction, and a plurality of correct results and a plurality of incorrect results from applying said plurality of rules on said plurality of documents;

determining a provenance graph of said plurality of rules applied on said plurality of documents, wherein for an operator of said plurality of operators, said provenance graph indicates a sequence of evaluations of a set of rules included in said plurality of rules that generates an output of said operator;

determining a first set of rule changes (high-level changes) to specify a set of operators of said plurality of operators to be changed to eliminate said incorrect results, wherein said determining said high-level changes is based on said provenance graph;

determining a second set of rule changes (low-level changes) to specify how to implement said high-level changes, wherein each low-level change specifies a change in a structure of an operator of said set of operators, or specifies an insertion of a new operator subtree in between two operators of said set of operators, wherein said determining said low-level changes includes:

determining a mapping from intermediate tuples to output tuples included in said incorrect results, wherein said intermediate tuples result from said high-level changes;

determining a top-k set of low-level changes for each operator of said set of operators and for a category of a plurality of categories of said low-level changes;

determining local effects of each low-level change of said top-k set of low-level changes; and propagating said local effects to said output tuples based on said mapping;

determining effects of said low-level changes on said correct results and on said plurality of rules;

generating a ranked list of said low-level changes based on said determined effects of said low-level changes; and implementing said low-level changes based on said ranked list, wherein said implementing said low-level changes includes refining said plurality of rules to eliminate said incorrect results and to minimize said determined effects of said low-level changes.

8. The system of claim 7, wherein said determining said top-k set of low-level changes includes determining a corresponding top-k set of low-level changes in a category of said plurality of categories, wherein said category specifies a modification to numerical join parameters $n_1$, $n_2$ that specify a range $[n_1, n_2]$, and wherein said determining said corresponding top-k set of low-level changes includes:

determining a plurality of utility values corresponding to values in said range $[n_1, n_2]$, wherein a utility value of said plurality of utility values corresponds to a value in said range $[n_1, n_2]$ and is based on a change in quality of a result of applying said plurality of rules with said value removed from said range $[n_1, n_2]$; and determining top-k sub-sequences of said range $[n_1, n_2]$ based on maximum summations of utility values included in said plurality of utility values.

9. The system of claim 7, wherein said determining said top-k set of low-level changes includes determining a corresponding top-k set of low-level changes in a category of said plurality of categories, wherein said category specifies a removal of entries in a dictionary file by removing corresponding entries in said dictionary file from input to said plurality of rules, and wherein said determining said corresponding top-k set of low-level changes includes:

grouping outputs of a Dictionary operator by entry in said dictionary file;

for each entry in said dictionary file that matches at least one high-level change, determining tuples that are eliminated from a result of applying said plurality of rules based on a removal of an entry in said dictionary file;

ranking said entries in said dictionary file according to an effect that removing each entry has on quality of said result; and generating a low-level change for the top 1 entry, the top 2 entries, ..., up to the top k entries based on said ranking said entries.

10. The system of claim 7, wherein said determining said top-k set of low-level changes includes determining a corresponding top-k set of low-level changes in a category of said plurality of categories, wherein said category specifies an addition of a new filtering dictionary that filters spans based on a presence of matches of entries of said dictionary file in close proximity, and wherein said determining said corresponding top-k set of low-level changes includes:

identifying tokens to the left and to the right of each span in a tuple affected by a high-level change of said high-level changes;

determining potential entries of said dictionary file by performing a union of said tokens;

ranking said potential entries according to an effect on quality of a result of applying said plurality of rules by filtering with said potential entries; and generating said top-k set of low-level changes based on said ranking said potential entries.

11. The system of claim 7, wherein said determining said top-k set of low-level changes includes determining a corresponding top-k set of low-level changes in a category of said plurality of categories, wherein said category specifies an addition of a filtering view, and wherein said determining said corresponding top-k set of low-level changes includes:

identifying each pair of views V1 and V2 such that V1 and V2 are not descendants of one another in a relational algebra representation of said plurality of rules;

for each filter policy selected from the group consisting of Overlap, Contains and Contained, identifying tuples of V1 that are in relationships with at least one span in V2;

ranking filters resulting from said identifying said tuples of V1, wherein said ranking filters is based on an effect on quality of a result of applying said plurality rules; and generating said top-k set of low-level changes based on said ranking said filters.

12. The system of claim 7, wherein said determining said provenance graph of said plurality of rules includes rewriting an SQL query Q representing said plurality of rules into a provenance query $Q^P$ by recursively rewriting each operator Op in a relational algebra representation of Q, wherein said recursively rewriting Op in Q preserves a result of Op along with additional provenance attributes through which information about input tuples to Op that contributed to a creation of an output tuple is propagated, and wherein given Op and a tuple t in said result of Op, said additional provenance attributes are sufficient to reconstruct tuples included in said input tuples that are responsible for generating said tuple t.

13. A computer program product, comprising:

a computer-readable, tangible storage device that is not a transitory form of signal transmission; and a computer-readable program code stored on the computer-readable storage device, said computer-readable program code containing instructions that are carried out by a processor of a computer system to implement a method of automatically refining rules for information extraction, said method comprising the steps of:

said computer system receiving a plurality of documents, a plurality of rules for information extraction, and a plurality of correct results and a plurality of incorrect results from applying said plurality of rules on said plurality of documents;

said computer system determining a provenance graph of said plurality of rules applied on said plurality of documents, wherein for an operator of said plurality of operators, said provenance graph indicates a sequence of evaluations of a set of rules included in said plurality of rules that generates an output of said operator;

said computer system determining a first set of rule changes (high-level changes) to specify a set of operators of said plurality of operators to be changed to eliminate said incorrect results, wherein said determining said high-level changes is based on said provenance graph;

said computer system determining a second set of rule changes (low-level changes) to specify how to implement said high-level changes, wherein each low-level change specifies a change in a structure of an operator of said set of operators, or specifies an insertion of a new operator subtree in between two operators of said set of operators, wherein said determining said low-level changes includes:

determining a mapping from intermediate tuples to output tuples included in said incorrect results, wherein said intermediate tuples result from said high-level changes;

determining a top-k set of low-level changes for each operator of said set of operators and for a category of a plurality of categories of said low-level changes;

determining local effects of each low-level change of said top-k set of low-level changes; and propagating said local effects to said output tuples based on said mapping;

said computer system determining effects of said low-level changes on said correct results and on said plurality of rules;

said computer system generating a ranked list of said low-level changes based on said determined effects of said low-level changes; and said computer system implementing said low-level changes based on said ranked list, wherein said implementing said low-level changes includes refining said plurality of rules to eliminate said incorrect results and to minimize said determined effects of said low-level changes.

14. The program product of claim 13, wherein said determining said top-k set of low-level changes includes determining a corresponding top-k set of low-level changes in a category of said plurality of categories, wherein said category specifies a modification to numerical join parameters $n_1$, $n_2$ that specify a range $[n_1, n_2]$, and wherein said determining said corresponding top-k set of low-level changes includes:

determining a plurality of utility values corresponding to values in said range $[n_1, n_2]$, wherein a utility value of said plurality of utility values corresponds to a value in said range $[n_1, n_2]$ and is based on a change in quality of a result of applying said plurality of rules with said value removed from said range $[n_1, n_2]$; and determining top-k sub-sequences of said range $[n_1, n_2]$ based on maximum summations of utility values included in said plurality of utility values.

15. The program product of claim 13, wherein said determining said top-k set of low-level changes includes determining a corresponding top-k set of low-level changes in a category of said plurality of categories, wherein said category specifies a removal of entries in a dictionary file by removing corresponding entries in said dictionary file from input to said plurality of rules, and wherein said determining said corresponding top-k set of low-level changes includes:
  grouping outputs of a Dictionary operator by entry in said dictionary file;
  for each entry in said dictionary file that matches at least one high-level change, determining tuples that are eliminated from a result of applying said plurality of rules based on a removal of an entry in said dictionary file;
  ranking said entries in said dictionary file according to an effect that removing each entry has on quality of said result; and
  generating a low-level change for the top 1 entry, the top 2 entries, . . . , up to the top k entries based on said ranking said entries.

16. The program product of claim 13, wherein said determining said top-k set of low-level changes includes determining a corresponding top-k set of low-level changes in a category of said plurality of categories, wherein said category specifies an addition of a new filtering dictionary that filters spans based on a presence of matches of entries of said dictionary file in close proximity, and wherein said determining said corresponding top-k set of low-level changes includes:
  identifying tokens to the left and to the right of each span in a tuple affected by a high-level change of said high-level changes;
  determining potential entries of said dictionary file by performing a union of said tokens;
  ranking said potential entries according to an effect on quality of a result of applying said plurality of rules by filtering with said potential entries; and
  generating said top-k set of low-level changes based on said ranking said potential entries.

17. The program product of claim 13, wherein said determining said top-k set of low-level changes includes determining a corresponding top-k set of low-level changes in a category of said plurality of categories, wherein said category specifies an addition of a filtering view, and wherein said determining said corresponding top-k set of low-level changes includes:
  identifying each pair of views V1 and V2 such that V1 and V2 are not descendants of one another in a relational algebra representation of said plurality of rules;
  for each filter policy selected from the group consisting of Overlap, Contains and Contained, identifying tuples of V1 that are in relationships with at least one span in V2;
  ranking filters resulting from said identifying said tuples of V1, wherein said ranking filters is based on an effect on quality of a result of applying said plurality rules; and
  generating said top-k set of low-level changes based on said ranking said filters.

\* \* \* \* \*